(12) United States Patent
Neill

(10) Patent No.: US 11,018,959 B1
(45) Date of Patent: May 25, 2021

(54) SYSTEM FOR REAL-TIME COLLECTION, PROCESSING AND DELIVERY OF DATA-TELEMETRY

(71) Applicant: RN Technologies, LLC, Garden City, NY (US)

(72) Inventor: Richard W. Neill, Garrison, NY (US)

(73) Assignee: RN TECHNOLOGIES, LLC, Garden City, NY (US)

( * ) Notice: Subject to any disclaimer, the term of this patent is extended or adjusted under 35 U.S.C. 154(b) by 202 days.

(21) Appl. No.: 15/782,492

(22) Filed: Oct. 12, 2017

Related U.S. Application Data

(60) Provisional application No. 62/408,754, filed on Oct. 15, 2016.

(51) Int. Cl.
| | | |
|---|---|---|
| *H04L 12/26* | (2006.01) | |
| *H04L 29/06* | (2006.01) | |
| *H04L 12/24* | (2006.01) | |

(52) U.S. Cl.
CPC ...... *H04L 43/026* (2013.01); *H04L 29/06006* (2013.01); *H04L 43/04* (2013.01); *H04L 43/062* (2013.01); *H04L 43/0876* (2013.01); *H04L 41/12* (2013.01); *H04L 41/145* (2013.01); *H04L 41/50* (2013.01)

(58) Field of Classification Search
CPC .................................................. H04L 43/026
See application file for complete search history.

(56) References Cited

U.S. PATENT DOCUMENTS

| | | | | |
|---|---|---|---|---|
| 2008/0236837 | A1* | 10/2008 | Lovell | H03M 7/30 166/336 |
| 2010/0318512 | A1* | 12/2010 | Ludwig | G06F 16/29 707/722 |
| 2014/0279707 | A1* | 9/2014 | Joshua | G06Q 30/0283 705/400 |
| 2015/0226058 | A1* | 8/2015 | Stolpman | E21B 47/18 702/9 |
| 2016/0007864 | A1* | 1/2016 | Scharf | A61B 5/6814 600/301 |
| 2017/0004089 | A1* | 1/2017 | Clemons | G06F 12/0893 |
| 2017/0293846 | A1* | 10/2017 | Zyglowicz | G06K 9/00335 |
| 2018/0054379 | A1* | 2/2018 | Bursell | H04L 41/5038 |
| 2018/0375743 | A1* | 12/2018 | Lee | H04L 29/08 |

* cited by examiner

*Primary Examiner* — Uzma Alam
*Assistant Examiner* — Sm Z Islam
(74) *Attorney, Agent, or Firm* — Lawrence G. Fridman, Esq; Feigin & Fridman, LLC

(57) ABSTRACT

A configurable data collection, processing and delivery system implements a unified data-flow execution pipeline in collection, processing and delivery of data to a target within or external to a computing device. Multiple data collection sets are defined from data available to the system and organized into at least one tensor based telemetry data stream associated with a service flow. At least one dynamically modifiable execution unit is provided to process the telemetry stream and the service flow. The telemetry stream is also processed into one or more target destination delivery streams that adheres to protocol, network characteristics, and transmission process required by the set of targets.

19 Claims, 14 Drawing Sheets

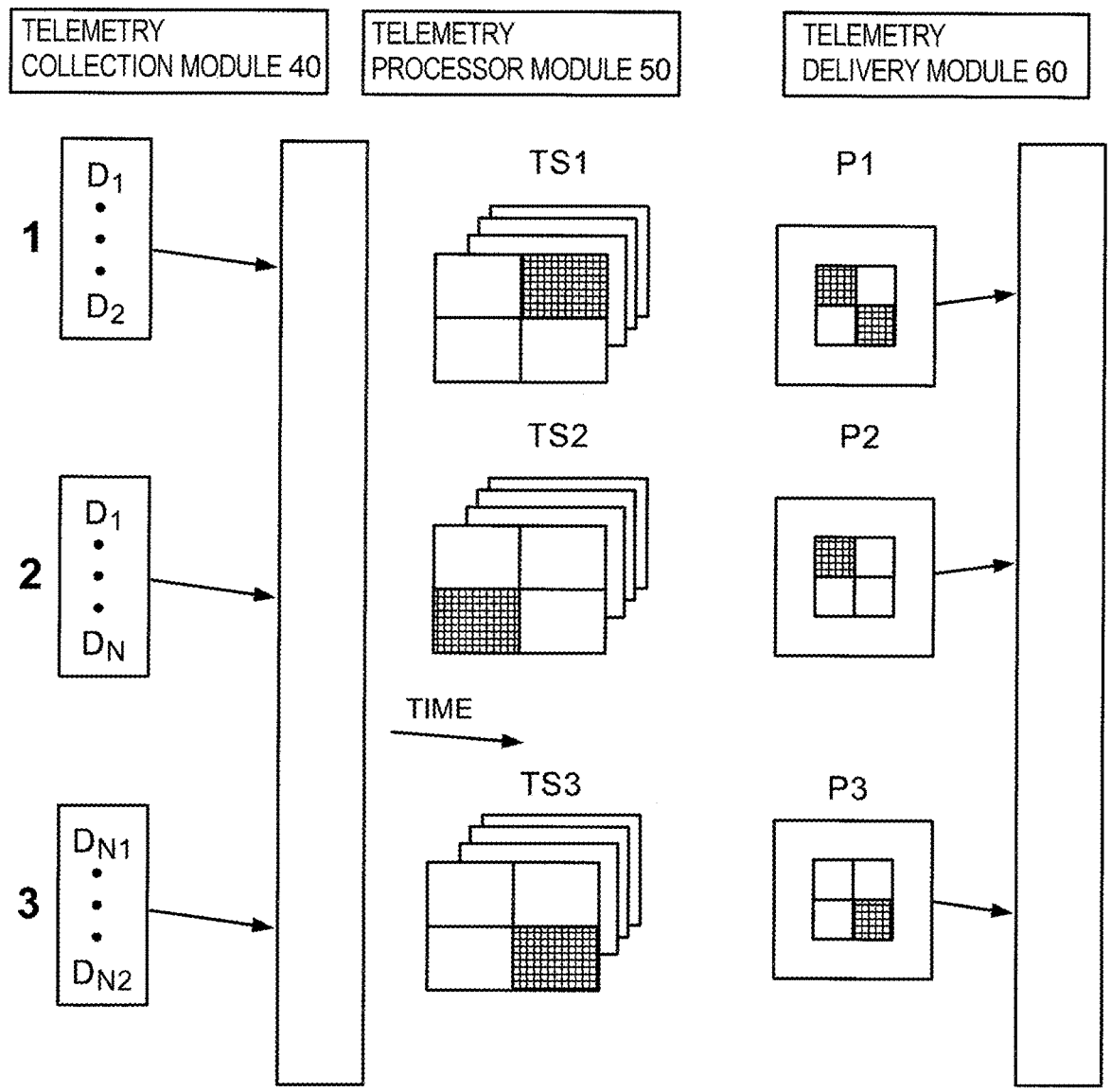
F I G. 5A

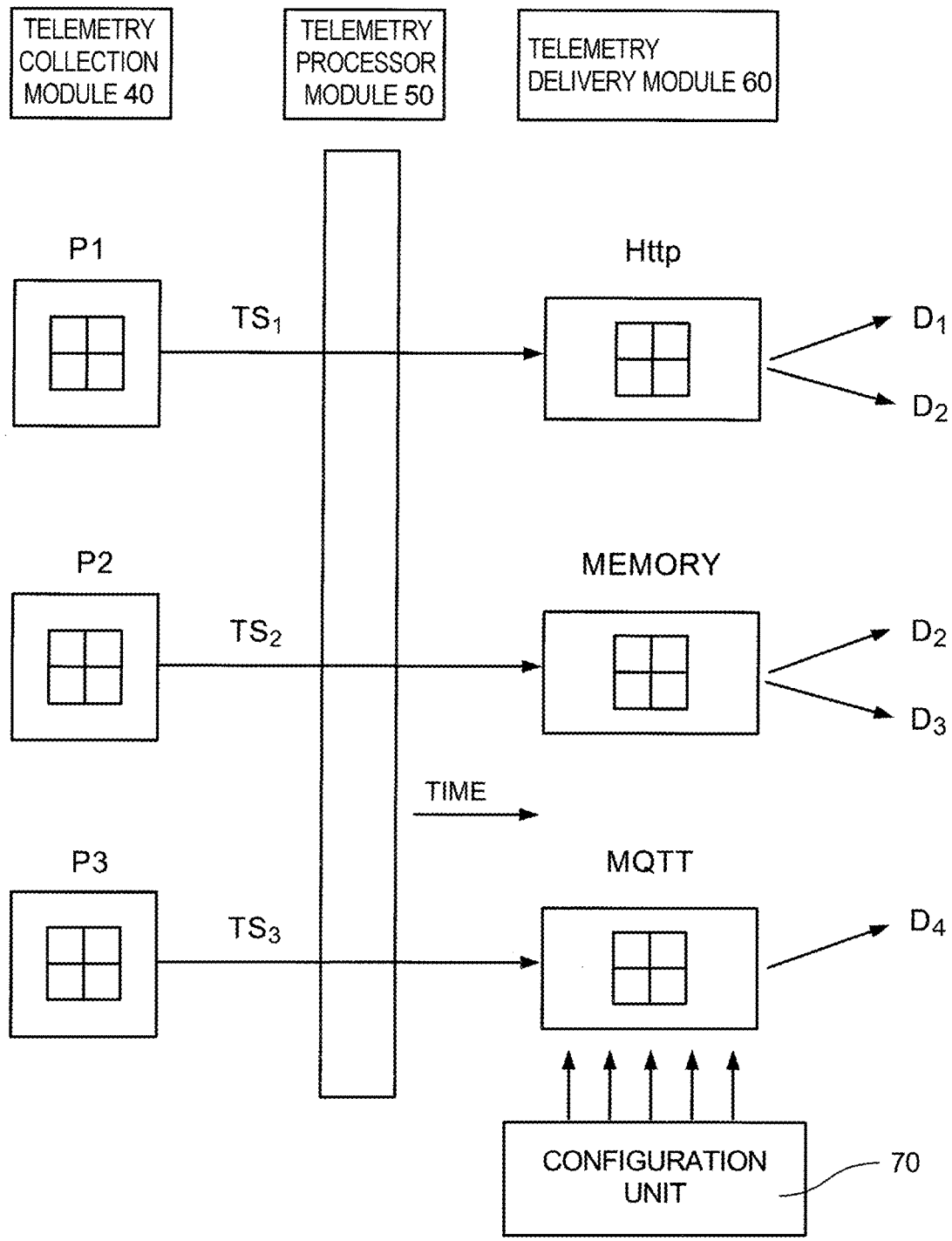
F I G. 5B

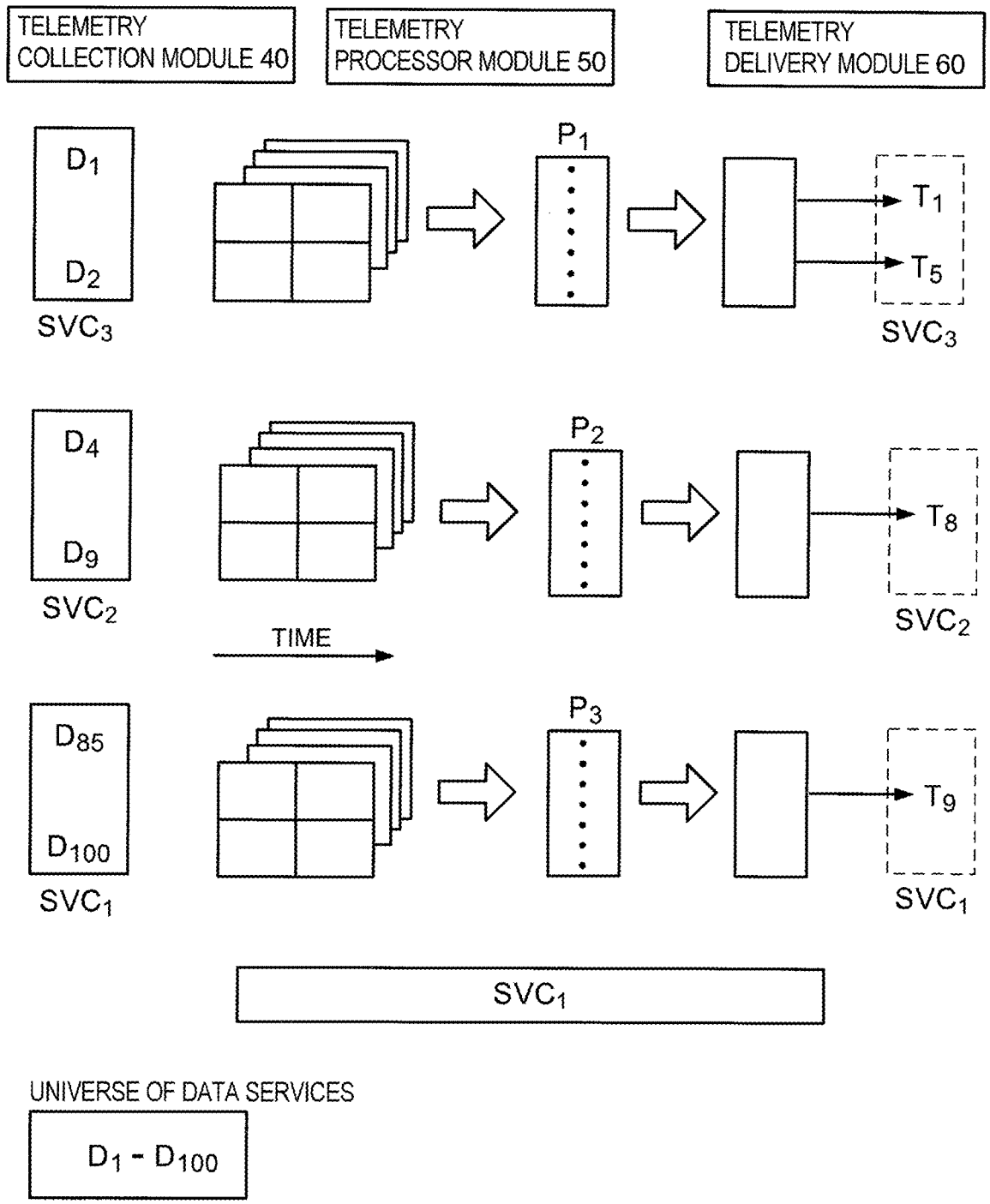
F I G. 10A

SYSTEM FOR REAL-TIME COLLECTION, PROCESSING AND DELIVERY OF DATA-TELEMETRY

REFERENCE TO RELATED APPLICATION

This Application claims priority of U.S. Provisional Application Ser. No. 62/408,754 filed by the inventor on Oct. 15, 2016, the entire disclosure of which is hereby incorporated by reference.

FIELD OF THE INVENTION

The invention relates in general to the field of collection, computation and distribution of telemetry into one or more service oriented data streams, and in particular it relates to implementation of a data-flow model for dynamically reconfigurable and reprogrammable telemetry collection, stream computation and processing platform suited to multiple application services each independently requiring large-scale data analytics, mining and machine learning applications.

BACKGROUND OF THE INVENTION

Prior art provides a device with a limited ability to collect a number of data elements, to package such elements into bundles associated to a plurality of application services and send them to a one or more servers or back-end systems where data elements are typical processed further according to a given applications or services requirements. Control functions are generally contained in a configuration file controlling what formats and frequency is being collected and identifies which devices are active and not active (passive) in data collection and delivery of said data to a destination system.

Typically, a configuration file resides in a client device. It is known in the prior art to provide a device running as a piece of software designed to collect various pieces of information, package and send the information to a central server. Once the data is collected, a part of the configuration file determines intervals for the data to be sent and processed through the central server. In the prior art, the ability to control client behavior is either fixed or very limited, i.e. the same behavior is provided for every single device participating in data-collection activity. Furthermore, in the prior art the transmission behavior is also limited to only one target destination (or single end-point).

In the prior art a neither device configuration nor the data-collection system implementation can control how and what data collected is being sent and to whom in a highly fine-grained manner. The prior art concepts do not address a variety of essential functions. For example, it is not possible to preprocess the data, i.e. by providing an encryption, to remove privacy related data or strip out essential information, apply arbitrary mathematical or algorithmic transformations or operations, execute machine learning algorithms, or to transform the data into something more useful for further processing. Users cannot execute algorithms to further process the data. The prior art systems primarily concentrate on collecting data and sending the data to a central server in a very basic form with no enhancement, enrichment, or meaningful transformations, operators, or algorithms in a services oriented manner, prior to distribution to respective final destinations.

On the other hand, one of the essential aspects/objects of the invention is to provide an agent platform that is highly configurable in terms of data collected, association to one or more services, processing by data and/or services type, and delivery behavior, while flexible to run on any kind of client, server or system of devices including cloud based computing infrastructure. The agent platform of the invention is not only highly configurable, enabling a user to collect a substantial variety of data, organizing the data in many different ways including organizing sets of collected data into distinct services, but is also capable of preprocessing and running computation against that set of data entities or services and send such sets of data and services to any combination of different delivery targets in accordance to the manner of transport required by the given delivery target instance. Another essential aspect of this invention is the fact that the data is designed to stream all data including any intermediary processing, and to each delivery target, in real time and within a structure that is organized around a tensor model of representation thereby enabling a compact representation of n-dimensional data for processing by any computational platform.

A further essential aspect of the invention facilitates building a very configurable, highly reprogrammable telemetry processing system based around the data flow computing model, enabling the processing of large amounts of diverse real-time data under collection, and to provide highly dynamic and configurable system that is suited for a vast variety of computing device applications such as those required to construct large-scale highly distributed machine learning systems and applications.

SUMMARY OF THE INVENTION

The invention discloses a software system implementing a dynamically reconfigurable and reprogrammable telemetry processing platform that enables highly-configurable real-time collection, processing, and delivery of data telemetry from one or more sources to one or more destination targets, with each telemetry stream independently and optionally processed in a fully dynamic manner. In the invention telemetry refers to any type of data, message, event, or signal conveying information from one point to another.

The invention provides a novel mechanism for data-collection, in-stream computation and processing of data, and flexible transmission as part of a service or multi-service applications platform. The process of collecting telemetry sources is fully configurable utilizing scriptable configuration for both internal and external measurements of interest.

Dynamically collected telemetry, or information, may be derived from multiple data sources simultaneously, including; physical or environmental information as measured by sensors, or hardware interfacing to external media such as fiber or broadband cable, network packets, or internal application or system processes associated to software, systems, network and hardware component activities. The invention is more specifically represents the design for a collection of software modules each executing collectively within typical embedded devices such as set-top boxes, but also including other devices such as home gateways and modems, computers, mobile phones, tablets, network or communications equipment, camera systems, sensors, or other embedded systems more generally classified as the Internet-of-Things (IoT). However, the software platform may also be implemented on any computing system such as application services, servers, data-base, and any cloud computing platforms. The process of telemetry delivery to destination targets is fully configurable in terms of delivery transport characteristics, protocols, and schedule, with each telemetry stream target configurable to one or more host systems across a communications network, or one or more device processes that co-reside with the invention itself. However, the invention is not limited to any specific device size or hardware type and may be utilized on any hardware or software system that contains at least one processor, memory, and network interface.

One of the essential aspects of the invention is the way the system components operate collectively, configured, and how data-telemetry sources are collected, organized, processed and then delivered to one or more destinations in real-time following a dynamic stream processing, data-flow computational model. Processing modules are dynamic and can be precisely targeted for addition, update, or removal.

Collected data is reorganized without any loss of quality or generality internally in terms of tensor based structures, then processed within a programmable stream execution runtime environment that executes algorithms based on one or more data flow computing platforms; with execution, concurrently or in parallel, across the one or more tensor based data streams. Finally, processed tensor data streams are packetized in configurable formats for data-delivery to their final destinations for further processing. The invention enables, to name a just a few, the implementation of sophisticated tools and platforms such as: real-time distributed data-mining, analytics and analysis on collected data from arbitrary sources; data visualization, large-scale data transformation; large-scale data reduction or compression, distributed machine learning and training of machine learning models; performing data-privacy, obfuscation, or anonymization of collected data prior to transmission; audience and user behavioral measurement, analysis and prediction; intelligent operational management platforms for systemic, network, or component-level monitoring, trend-analysis, anomaly-detection, fault-detection, fault-prediction, and remediation; enablement of virtualized data-collection into one or more telemetry streams organized as streams of service or multi-services. That is, collected telemetry may be organized in a configurable method into one or more sets of independent services or multi-services where each service or multi-service may be independently processed and then delivered to a configurable set of destinations according to the transport and delivery requirements of each destination end-point or delivery target.

BRIEF DESCRIPTION OF THE DRAWINGS

Referring now to the drawings which are provided to illustrate and not to limit the invention, wherein:

FIG. 5A depicts a simplified diagram of the entire platform/system.

FIG. 5B is a diagram depicting data structures P1, P2 and P3 which have been converted to internal tensor structures emitted from the Telemetry Collection Module.

FIG. 10A is a diagram depicting services oriented architectural model representation of the Dynamic Telemetry Agent Platform system of the invention.

DETAILED DESCRIPTION OF THE INVENTION

Figure 1:
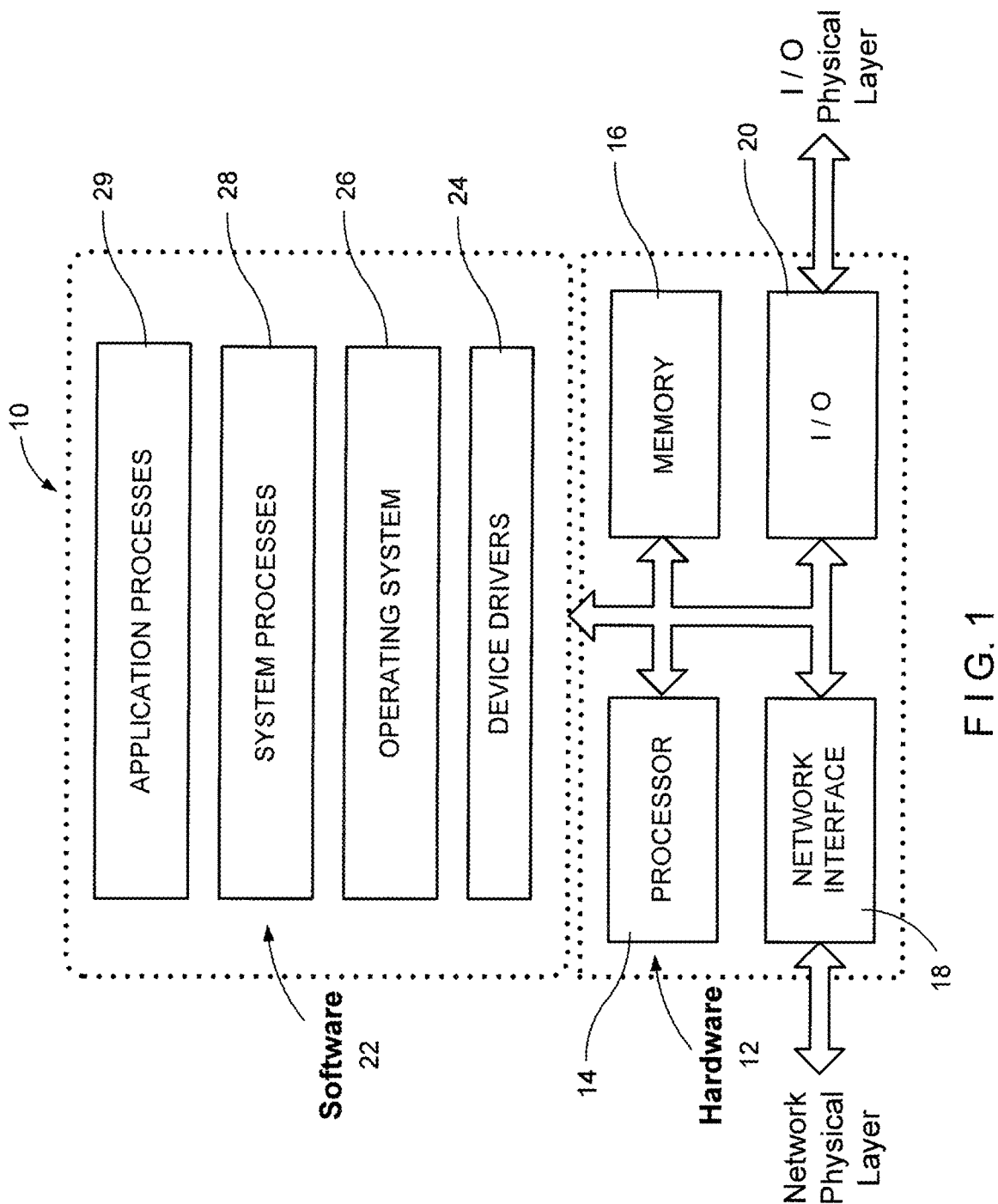
FIG. 1 is a diagram depicting a device/system which is capable of executing software and acting as a source of telemetry from internal sources received or measured from external sources.

Referring now to the drawing in general and specifically to the diagram of FIG. 1 illustrating a device/system 10 that is capable of executing software. This device/system can be used in consumer or commercial applications, service providers, network or communications infrastructure, sensors (both wired and wireless), or application specific embedded devices as well as larger computer and private or public Cloud based data-center class platforms offered by Amazon, Google, Microsoft, IBM as well as numerous other entities. Devices may also constitute SoC (System-On-Chip) which represent a class of devices that embed multiple functions and processing units within a single integrated chip substrate. The invention may be executable on any device that minimally contains hardware functions such as processor, memory, network and Input/Output (I/O) interfaces, as well as a software operating system and associated other software components illustrated in FIG. 1.

The lower section 12 of FIG. 1 diagram, identified as "Hardware" contains all hardware or chip level components inclusive of internal registers and circuitry including a processor 14, memory 16, network interface 18 and I/O 20 which each interface to one another over one or more internal connection networks. The processor 14 may be a single or multiple processing core based CPU. The hardware 12 may include or be composed of single or multiple SoC (System-on-Chip) or FPGA (Field-Programmable-Gate-Array) devices. The memory system 16 may be distributed or unified in support of multiple functional blocks, but in either case memory is available to any hardware or software element within the device. The network interface 18 as shown provides connectivity and communication operations to and from external systems based on one or more media interfaces such as Ethernet, wireless, LTE, fiber, coaxial, DOCSIS or video transports, ZigBee, RF, Bluetooth, to name a few. The I/O 20 function enables the device to interface to the external environment with any number of interfaces such as USB, video display, cameras, image detection, robotic mechanisms, measurement and/or sensor devices and networks of such devices. Not shown, but inclusive of typical hardware are capabilities that include graphics processing units, video, and specialized circuitry for image processors, security and encryption which may reside in hardware level processors, software and typically a combination of both hardware plus software.

The upper portion 22 of FIG. 1 diagram identified as "Software" illustrates software components typical of devices previously described. Stack layers are described from bottom to top of the figure. The device drivers 24 and the operating system 26 are co-resident to integrate and manage the operation of the hardware functions (including virtual machines that simulate the execution of a target environment within a given host environment) along with all system resources. The software environment or stack also consists of a multiplicity of system processes 28 and services which may also contain middleware software and virtual machines to which higher-level services and features are supported. For example, the combination of hardware, device drivers, operating system, system processes capabilities and functions support the execution of one or more application processes 29 whose function is dependent on the devices intended purpose. For example, in a set-top box software eco-system, all hardware and software services work together to provide video content and interactivity in the form of user interfaces for navigation of content, linear channels, and video-on-demand (VOD). A smart phone or tablet application environment provides a gesture based user experience with support for multiple downloadable applications. In a network device such as a switch, router or wireless access point the resident application ensemble operates closely with the system services and operating system/driver layer to supports specific capabilities of the switch, router or wireless access point. Sensors and devices categorized as IoT follow similar software architectural patterns.

A key attribute for hardware 12 and software 22 components shown in FIG. 1 is their ability to provide and generate telemetry (data) that may be collected by a co-resident software process also executing within the device.

FIG. 1 illustrates a representative but not limiting class of hardware and software elements, devices, systems or machines the present invention may execute on or within.

Figure 2:
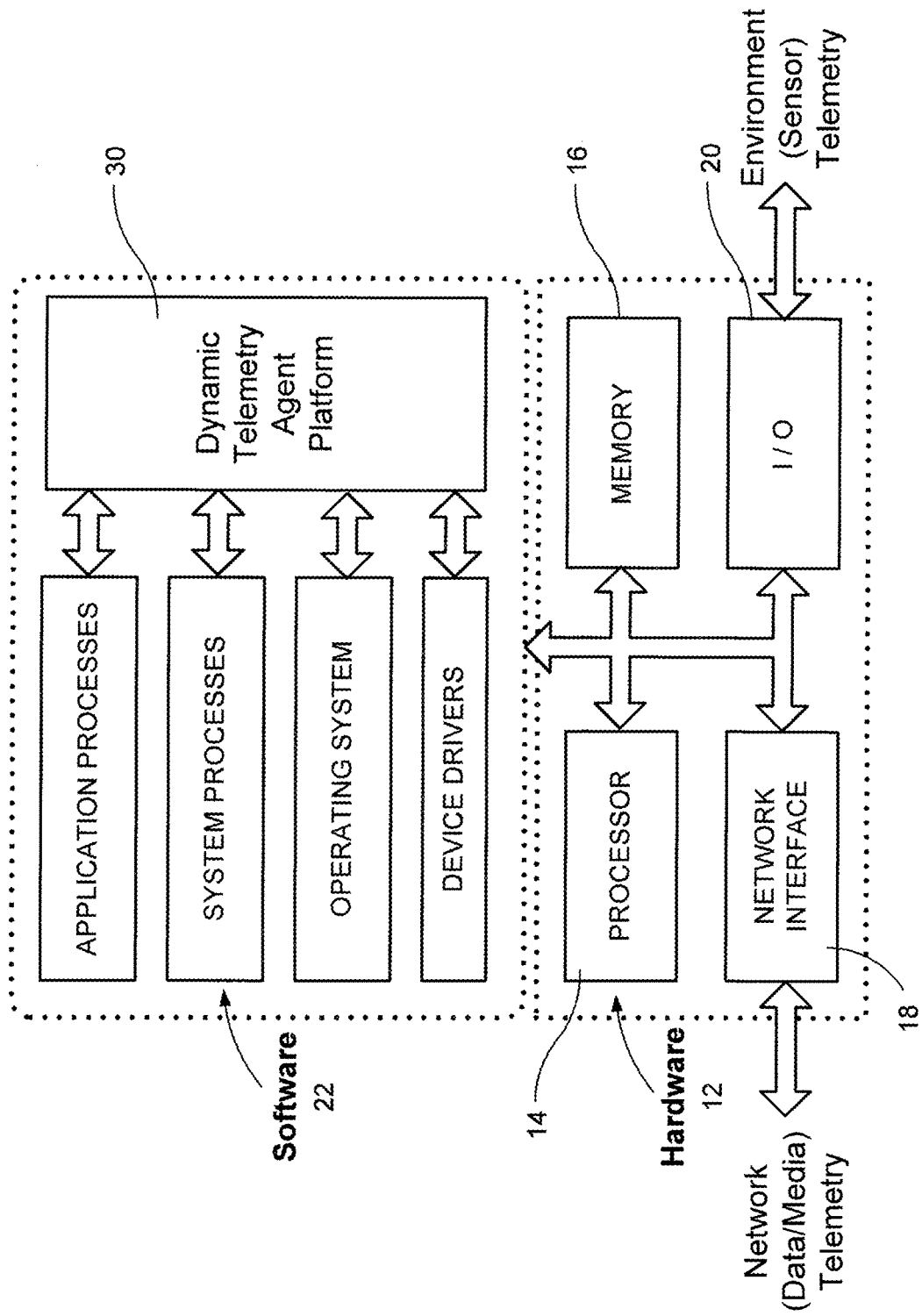
FIG. 2 is a diagram depicting integration of a dynamic telemetry agent platform of the invention with hardware/software and physical interfaces to functional blocks each serving as a source of telemetry to the dynamic telemetry agent platform.

FIG. 2 illustrates the concept that the dynamic telemetry agent platform has visibility to all data sources from elements of the system disclosed in FIG. 1, including, but not limited to, hardware and software, each of the sub-components within as illustrated in FIG. 2, and including network interfaces and all environmental data sources. For the purposes of the application, the term telemetry means any data, information, or signaling, or data from application systems, operating systems, device drivers or any of the hardware, processors, SoC, chip registers, network, I/O information that is available to the agent. The actual architecture of the telemetry agent platform consisting of four blocks is illustrated and will be discussed with reference to FIG. 3.

More specifically, the diagram of FIG. 2 depicts the integration of dynamic telemetry agent platform 30 with device hardware/software functional blocks. Each software block 22 contains and is capable of emitting telemetry data associated with the given software blocks functionality and operation. Additionally, network interface 18 and I/O 20 related telemetry representing both internal and external telemetry associated with a network, communications traffic flows, physical media, externally attached hardware, and all environmental information including but not limited to such as video, images, geo-spatial to name a few, are available from sensors or sensor networks accessible to the device.

Telemetry is dynamic and streamed throughout all device hardware/software operation, and system, network, sensory input, input/output, and user actions. For example, data collected from application processes may characterize user interactions and behavior. Data collected in response to viewer behavior can result in different content experiences and user interactivity as subscribing services utilize and process collected telemetry appropriate to the given service. Similarly, telemetry from all sources may be utilized to characterize or predict the device, hardware and software component operating performance, efficiency, abnormalities, and health. Telemetry from hardware components (Network Interface 18 and I/O 20 functional blocks) may further indicate systemic and network characteristics, behavior, and abnormalities useful in operating and managing the overall infrastructure. Without loss of any generality, data collected may be derived from other software agents, proxies or systems that collect data and expose that data in some communications or network manner to the invention herein.

In summary, internal and externally available information is available for collection by dynamic telemetry agent platform illustrated in the generalized representative architecture for a device shown in FIG. 2. Internal information may be collected from any software program or process, including internal hardware. External measurements of interest from the network, environment, other data collection capable software, systems, and devices, attached hardware, and other physical environmental information acquired through sensors or sensor networks can also be collected utilizing the hardware/software system illustrated.

Figure 3:
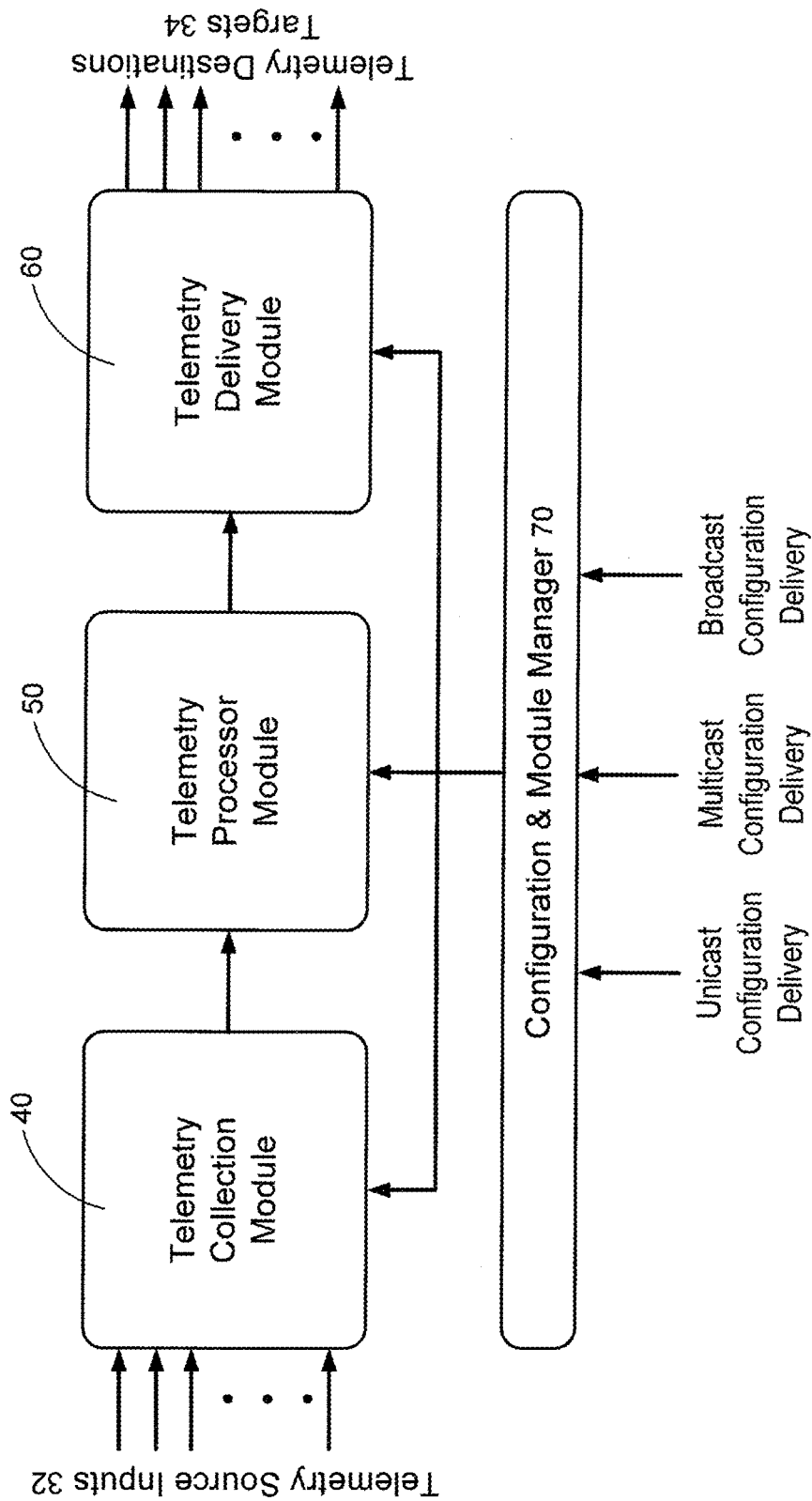
FIG. 3 is a diagram depicting in greater detail the architecture of dynamic telemetry agent platform illustrated as a pipeline of stream processing elements shown in FIG. 2.

Referring now to FIG. 3, wherein on the left side multiple arbitrary number of telemetry source inputs 32 are shown, which were discussed with respect to FIGS. 1 and 2. Each of the source inputs 32 are accessed by the Telemetry Collection Module 40 for initial processing before delivery to the Telemetry Processor Module 50. From the Telemetry Collection Module, the output data streams are sent to the Telemetry Processor Module for further processing before delivery to the Telemetry Delivery Module 60 for final processing and distribution. The final output of the agent platform emits from the Telemetry Delivery Module 60 where all processed data streams are delivered to one or more destination targets 34 which may be any of device, server, system, cloud, network address, software process, or internal/external memory. It is important to note that each of the respective modules processes and distribute data across modules according to a stream based model of real-time computation. Thus, each module in FIG. 3 is structured in a series pipeline fashion whereby one module outputs is the input to the next in a chain. This is a computational model that differs from many other types of computational models utilized for device telemetry processing and is a distinctive capability of the present invention. FIG. 3 discloses a Configuration and Module Manager 70 that controls and manages the module configuration, operation and behavior of each module of the invention.

The diagram of FIG. 3 depicts in greater detail the architecture of dynamic telemetry agent platform shown in FIG. 2. As illustrated in FIG. 3, the software platform of the invention consists of four major functional modules; 1)

Telemetry Collection Module 40, 2) Telemetry Processor Module 50, 3) Telemetry Delivery Module 60, and 4) the Configuration and Module Manager 70. The Telemetry Collection Module 40 is responsible for interfacing and collecting data from all hardware/software data-sources as shown in FIG. 2 and normalizing collected data into one or more streams for further processing and delivery. The Telemetry Processor Module 50 is responsible for executing a configurable set of algorithms or operations in a specified order, or data flow, whose computation is modeled as task-graph on each stream of data. The output from each data flow graph is sent to the Telemetry Delivery Module 60, which packetizes and delivers processed data streams to one or more destinations in the desired protocol format. The Configuration and Module Manager 70 is responsible for bootstrapping the other modules and controlling their runtime operation lifecycle and code updates. The grammar used by the Configuration and Module Manager 70 supports a wide range of features defined in sections. Configuration statements define type label definitions and mappings for data, variables, functions/tasks, processor module platform components and algorithms, network resource locators, rule-based and fuzzy-based predicate logic, and regular expression syntax to fully describe each module dynamic behavior and operation. Additionally, within the Telemetry Processor Module 50, configuration grammar specifies the operation of the virtual machine environment to control the one or more computation modules.

The architecture of the dynamic agent platform illustrated in FIG. 3 as a pipeline of stream processing elements is organized as a data-flow machine/arrangement where the Telemetry Collection Module 40 receives all data telemetry inputs 32, performs parallel streaming computation, generates or emits output as one or more data or service streams. Next, the Telemetry Processing Module 50 receives all Telemetry Collection Module outputs, performs parallel streaming computation, generates or emits output in the form of one or more data or service streams. Finally, the Telemetry Delivery Module 60 receives all Telemetry Processing Module outputs, performs parallel streaming transport processing, delivery and distribution of one or more data or service streams, to one or more destination targets 34. All module operations are configurable and under the control of the Configuration and Module Manager 70. Configuration may be delivered to the Telemetry Agent platform by any number of network delivery methods including unicast, multicast or broadcast.

In terms of telemetry agent implementation, software modules either individually, or collectively follow a dynamic data-flow streaming model of operation both within and across modules. The Telemetry Collection 40, Processor 50, and Delivery 60 Modules may be implemented using a variety of design methodologies to achieve the architecture in FIG. 3. The following alternatives are available: 1) one or more multi-threaded, module-specific processes with defined functionality at runtime; or, 2) module-specific virtual machines for added flexibility in terms of programmability and dynamic reconfigurability; and, 3) a combination or hybrid approach of both. The Configuration and Module Manager 70 is specifically implemented only as a multi-threaded process that is initialized and executed during telemetry agent launch occurring during operating system process initialization. To support inter-module communications, modules may communicate with one another through standard shared memory or message passing primitives support by operating systems. Internal data structures are designed to be configurable in format to allow for support and integration to industry leading data-analytics and machine learning frameworks.

Basic telemetry agent operation is as follows: based on dynamic reconfigurability (ability to modify the operating characteristics or configuration of the collection module at any time) one or more telemetry sources are accessed by the Telemetry Collection Module 40 according to their activation state (on/off) and targeting criteria (selection of device and associated collection attributes is specified through multiple criteria methods such as conditional predicates and/or regular expression matching) and normalized (value and data-type normalized into tensor based data-structures depending on the telemetry source) into one or more internal data streams also referred to as tensor streams. Additionally, tensor stream instances may be associated to one or more service or multi-service streams also referred to as service flows by unique identifiers or services id. The ability to assemble telemetry entities into a virtual service flow by service type provides a mechanism for independently managing the characteristics and required processing sets of data collections for efficient post-processing by an application or cloud platform.

All collection criteria and general operation of the Telemetry Collection Module 40 is controlled by Configuration and Module Manager 70 illustrated in FIG. 3. One or more Telemetry (tensor) streams, and optionally organized into one more service flows are then forwarded to a Telemetry Processor Module 50 where zero, one, or more software algorithms are executed within a specialized virtual machine execution environment that is designed to host a set of pluggable dynamic platform modules execution environments that can process each telemetry steam in module specific computational model independently and concurrently. Telemetry Processor platform execution modules 50 may be: 1) a proprietary static or dynamic task-graph oriented data flow processor engine, 2) based on a simplified imperative code execution style engine with pre-defined configurability, 3) one or more third-party platform engines designed to execute either imperative or data flow style task-graphs. (Examples include, but are not limited to: Google Tensorflow, Theano, Torch, Caffe, Python scikit-learn, MLlib, and MXNet execution frameworks for machine learning and data analytics), or 4) any combination of the above. In general, the Telemetry Processor Module platform virtual machine runtime environment 52 (see FIG. 5C) is dynamic and allows for new platform modules to be targeted (utilizing configurable targeting methods) for addition, removal, or updated as necessary without restarting the virtual machine environment. This facilitates support for new capabilities as modules are newly developed and remote field updates of Telemetry agent platform capabilities.

Since the overall architecture shown in FIG. 3 follows a data-flow execution model end-to-end, it follows that all modules can be implemented in such manner to execute within a single configurable virtual machine environment if so desired, as the present invention is not limiting to the way the collective system is implemented, provided all capabilities of the invention are supported.

In the absence of a task-graph associated to any given stream, the virtual machine executes an internal null task graph operation module by default. This has the effect of connecting the given stream directly (defined through stream configuration mappings) from the Telemetry Collection Module 40 to the Telemetry Delivery Module 60 through the Telemetry Processor Module 50 with no additional operations occurring on the stream. In this mode, the Telemetry Processor Module 50 is effectively "dropped out" of the data flow stream processing pipeline, with collected telemetry converted to streams and delivered directly to their respective destination targets. In the case where the Telemetry Processor Module 50 is disabled or not present, all streams will flow directly from the collection through to the Delivery Module 60. This would be the case where no stream processing is to occur, and Telemetry agent is operating in a reduced or simplified functionality mode.

The execution workflow and operation of the Telemetry Processor Module 50 virtual machine/arrangement is managed and controlled by the Configuration and Module Manager 70 defining virtual machine platform configuration, module configuration, operation, and behavior, and depending on the execution module, associated task-graph processing libraries (algorithms), along with their respective code management. Once each telemetry stream has traversed its task-graph via Telemetry Processor Module 50 execution, the respective stream is immediately forwarded to the Telemetry Delivery Module 60 where it is encapsulated into the appropriate delivery format or packet, where it is then delivered to one or more target destinations based on a configurable schedule and transport definition associated to the telemetry stream. Transport definitions can be any combination of external destination hosts, services and ports over various transport protocols such as UDP, TCP, HTTP, MQTT, WS/REST, Multicast, etc. or internal destinations including other processes, memory locations, to which telemetry can be utilized for services operating within the device. For example, a self-monitoring service for the local operating system, middleware, or set of applications can act on telemetry data emitted from the Telemetry Delivery Module 60 to effect internal remediation or self-healing processes, or to improve device operation, performance, etc. including any and all of the internal software processes. Other internal uses may include utilization of processed data to drive or influence the behavior, functionality and operation, of system, application, and device software/hardware processes. Each of the modules is described further in the following sections.

Figure 4:
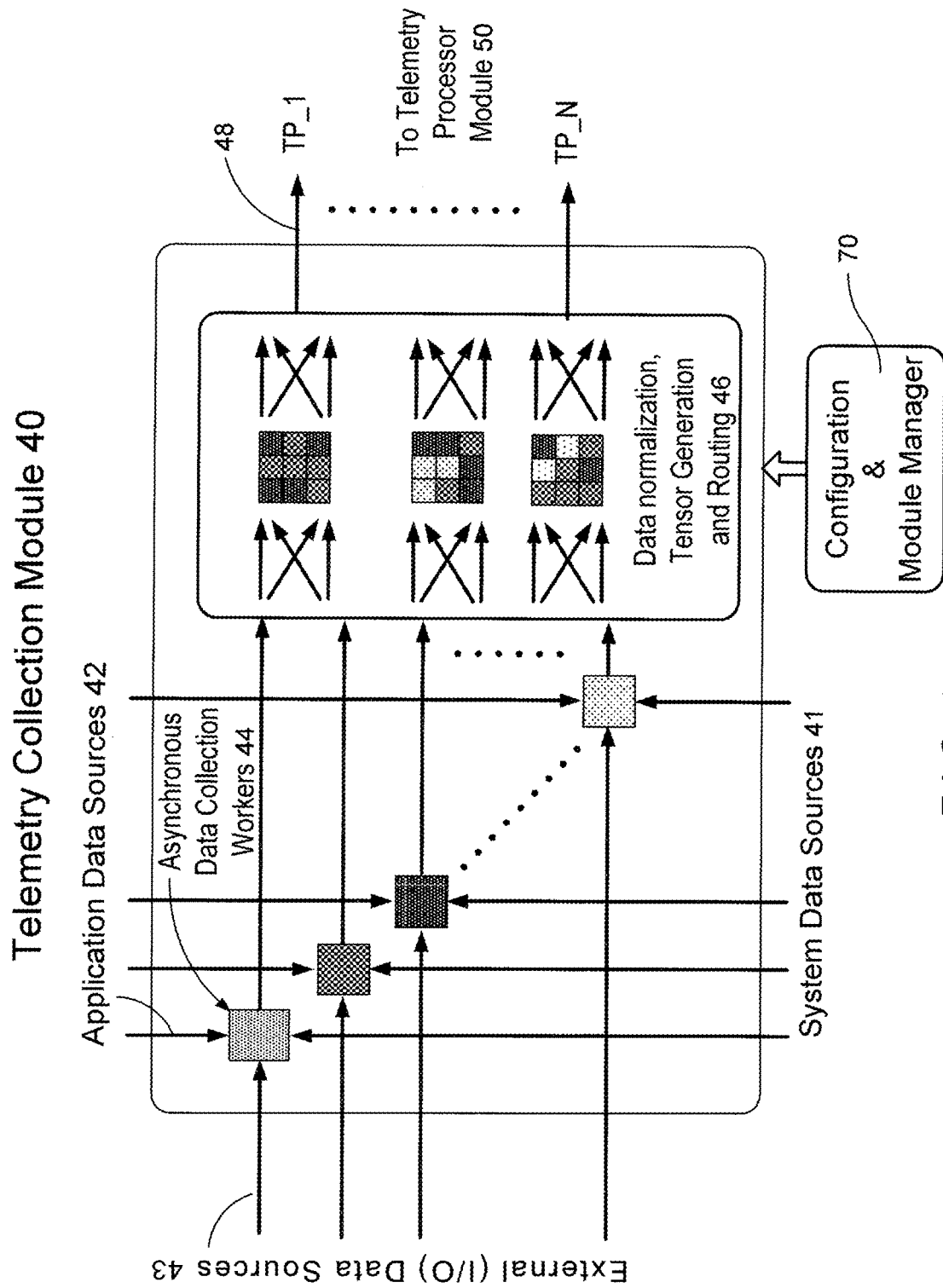
FIG. 4 is a diagram illustrating a representative implementation of the Telemetry Collection Module.

FIG. 4 depicts a representative implementation of the Telemetry Collection Module 40, which is the primary module having direct visibility or access to all the data entity sources that the agent has access to. FIG. 4 shows various application data sources 42, including but not limited to: input/output data sources, network, physical layer, application, hardware such as processor, SoC, and memory, and system/application processes data sources that are collected by one or more asynchronous collection workers that operate independently and concurrently with respect to one another. The essential functionality of the Telemetry Collection Module 40 is to collect raw telemetry data sources 42, normalize and/or re-encode (convert labeled data utilizing one hot-encode method as an example) telemetry data into suitable formats as required, reorganize collected telemetry data into one or more sets of tensor data structures for efficient representation, and finally stream all telemetry streams (represented as tensor streams) as one or more service flows, or multi-service flows for further processing by the Telemetry Processor Module 50. Each service flow is identified with a unique service flow identifier to facilitate high-speed, index based manipulation and routing of telemetry streams.

The Telemetry Collection Module 40 operation is based on the execution of configuration grammar by the Configuration and Module Manager 70 controlling the behavior of the Telemetry Collection Module 40. The configuration grammar additionally defines the mapping between telemetry data source structure and one or more tensor structures created as a result of the Telemetry Collection Module 40 operation. Since any given tensor varies from zero rank up to rank-N, the representation of telemetry data values may be of any type including scalers (simple constants, integer, floating, Boolean, or string data) through N-dimensional matrices of any type and size, or variation of types, and sizes, may be represented by the resulting tensor structures. Each tensor represents a composition of data elements that are continuously generated in time as sequence of tensor structures forming a tensor stream. Such tensor stream is a real-time data stream continually evolving in time to infinity, as long as the tensor structures are being generated. That begins the basis of the stream computing aspect of the invention.

In the Telemetry Collection Module 40 illustrated in FIG. 4, data obtained from the multiple data sources such as: System 41, External 43 and Application 42 is collected by one or more asynchronous data-collection worker threads. Each worker 44, illustrated as square-shaped elements in FIG. 4, is responsible for its integration to the corresponding data-source (leveraging platform specific API's) and based on the configuration, accesses the source data. The data-collection workers 44 are configurable, including definition of data sources and their corresponding labels, collection activation or targeting criteria at both the device and data-source level, per data source collection frequency, and other temporal parameters associated with collection behavior. As data is collected by each of the N (where N is maximum number of collection sources) asynchronous collection workers 44, it is forwarded on to the data normalization and tensor generation unit 46 (illustrated in the middle portion of FIG. 4), where each incoming data element is normalized (according to a configurable set of statistical/mathematical or one-hot encoding functions), grouped accordingly into "data-sets" and/or service-flows, then converted into a unique tensor stream data-structure based on the data-set/service-flow type requirements. For compatibility with emerging machine learning platforms the data-model generated by the Telemetry Collection Module 40 is designed to be configurable in terms of support for multiple data models such as popular industry cloud platforms for machine learning computing including, but not limited to; Google, Amazon, IBM and Microsoft as well as environments including, but not limited to; Google's Tensorflow, H2O, Theano, Caffe, MXNet, Torch, Python sci-kit learn, and MLlib. In addition, an internal, proprietary format is also supported in cases where custom data-models must be supported. The data model mapping can be extended to support other formats as they involve and require support through update to the data normalization and tensor generation unit, under control of the Configuration and Module Manager 70. The ability of the agent to stream collected data into leading industry data models in real-time allows for highly-efficient Cloud or back-end server-side based processing for all delivered telemetry streams since they can be handled natively with no additional conversion overhead. The actual conversion or mapping operation from a sequence of collected data elements in their localized data type into a tensor stream is based on a configuration template (that defines the mapping) generated by the Configuration and Module Manager 70.

In Telemetry Collection Module 40 available data-sources 41,42,43 are processed (collected) by asynchronous data-collection workers 44 (to enhance data-mining performance by parallelizing the collection of each distinct data source)

in real-time, streaming model of processing, and whose function is to normalize and transform all collected telemetry into an internal streaming data format represented as a tensor structure for additional processing by the Telemetry Processor Module 50. Which data sources are organized for a given tensor structure is defined under the control of the Configuration and Module Manager 70. In addition, one or more data sources and their corresponding tensor structures may be associated to a unique service stream or multi-service stream in the case of multiple services associated to a unique service stream.

FIG. 4 discloses the grouping operation as a mapping operation, where one or more incoming data sources 41,42, 43 are routed into a single tensor stream representation which is emitted as a set of telemetry stream outputs 48 (shown as labels TP_1-TP_N). Each of TP_1 through TP_N is some combination of the available collected data sources, in a pre-defined tensor stream structure according to the type requirements which may additionally represent one or more service-flows each containing any permutation of telemetry tensor streams. The design of the Telemetry Collection Module 40 is not limited to a single tensor stream data-model. That is, each telemetry stream TP_1-TP_N output can have a differing tensor stream structure enabling support for a multiplicity of processing frameworks that operate on the given telemetry stream. The essential aspect of Telemetry Collection Module 40 functionality in its ability to collect multiple data-sources and construct arbitrary collections of the data-sources into one or more telemetry streams 48 or collections within one or more service flows following configurable standard tensor data-structure formats for further telemetry agent processing or delivery to back-end or cloud platforms with large-scale computational resources.

Referring now to FIG. 5A representing a simplified diagram of the entire system. The Telemetry Collection Module 40 is shown on the left side of FIG. 5A, with arbitrary representation of sets of data entities in the telemetry collection phase. The output of the telemetry collection phase is shown in FIG. 5A with three telemetry streams, wherein each telemetry stream contains a continuous stream of tensor structures TS1, TS2 and TS3 representing inputs from any of the sources discussed in the application. The data structures are different in each of these streams. Each data structure is shown with different (checkerboard) pattern. Three-dimensional representation of these patterns in FIG. 5A represents continuous series of tensor streams that develop in time. The tensor streams are directed into the Telemetry Processor Module 50, shown in the middle portion of FIG. 5A. There are three representative processing modules P1, P2, and P3, each containing a set of operators, algorithms or functions that operate on the incoming tensors streams TS1, TS2, TS3. Processing units P1, P2 and P3 shown at the right side of FIG. 5A represent the processed inputs TS1, TS2, and TS3 each illustrated within each processing unit by the Telemetry Processor Module 50. Each processing unit generates its output as a continuous flow of resultant telemetry streams each respectively structured as a tensor stream within a service flow, directly forwarded to the Telemetry Delivery Module 60 also illustrated in FIG. 5B.

It is illustrated in FIG. 5B diagram that telemetry streams TS3, TS2 and TS1 are emitted from the Telemetry Processor Module 50, and consumed by the Telemetry Delivery Module 60, where each processed telemetry stream is encapsulated into multiple transport types as shown, and delivered to target systems D1, D2, D3, and D4. Note the Configuration Unit 70 applies to the Telemetry Delivery Module 60 as a whole in order to define each of the transports operating behavior. More specifically, the left side of FIG. 5B the diagram illustrates each of the fully processed telemetry streams, processed by P1, P2 and P3 as described in the previous section and illustrated in FIG. 5A. As each telemetry stream is processed, the next phase in the telemetry pipeline is to deliver various tensor/telemetry streams within their respective service flows and to their destinations. FIG. 5B depicts previously discussed processing units P1, P2 and P3 and the telemetry streams TS3, TS2 and TS1 which are emitted from the Telemetry Processor Module 50, and then consumed by the Telemetry Delivery Module 60. The purpose of the Telemetry Delivery Module is to encapsulate each of the tensor/telemetry streams and into a protocol suitable for delivery to the target criteria that is associated with that particular telemetry stream. The Configuration Unit 70, shown at the lower portion of FIG. 5B, is provided to assure that each tensor/telemetry stream is being delivered in its own way, to define each of the transports operating behavior different from others. For example, the top part of FIG. 5B shows that the telemetry stream TS1 is being encapsulated in Http messaging protocol and sent to destinations D1 and D2. The middle part of FIG. 5B shows that the telemetry stream TS2 targets the local system memory. This means that the actual destination is the system platfoirm internal memory that may be utilized by the telemetry agent, one or more operating system processes or applications executing in real-time. As an alternative, TS2 can be consumed by another process or another application that is running within the actual device that the invention is hosted on. As a further alternative illustrated in FIG. 5B, the telemetry stream TS2 is directed to destinations D2 and D3, whereas D2 and D3 are memory regions within device, system or application processes each executing independently on the local device.

The bottom part of FIG. 5B depicts that the tensor/telemetry stream TS3 is wrapped in MQTT messaging protocol, that is directed to destination D4, which could be a Cloud or remote system as typically hosted by Amazon, Google, Microsoft, or IBM as examples. The configuration also manages various tasks, which include not only the encapsulation technology, and not only where the targets associated with each telemetry stream are addressed, but also include the schedule and frequency of all telemetry delivery behavior.

Figure 5C:
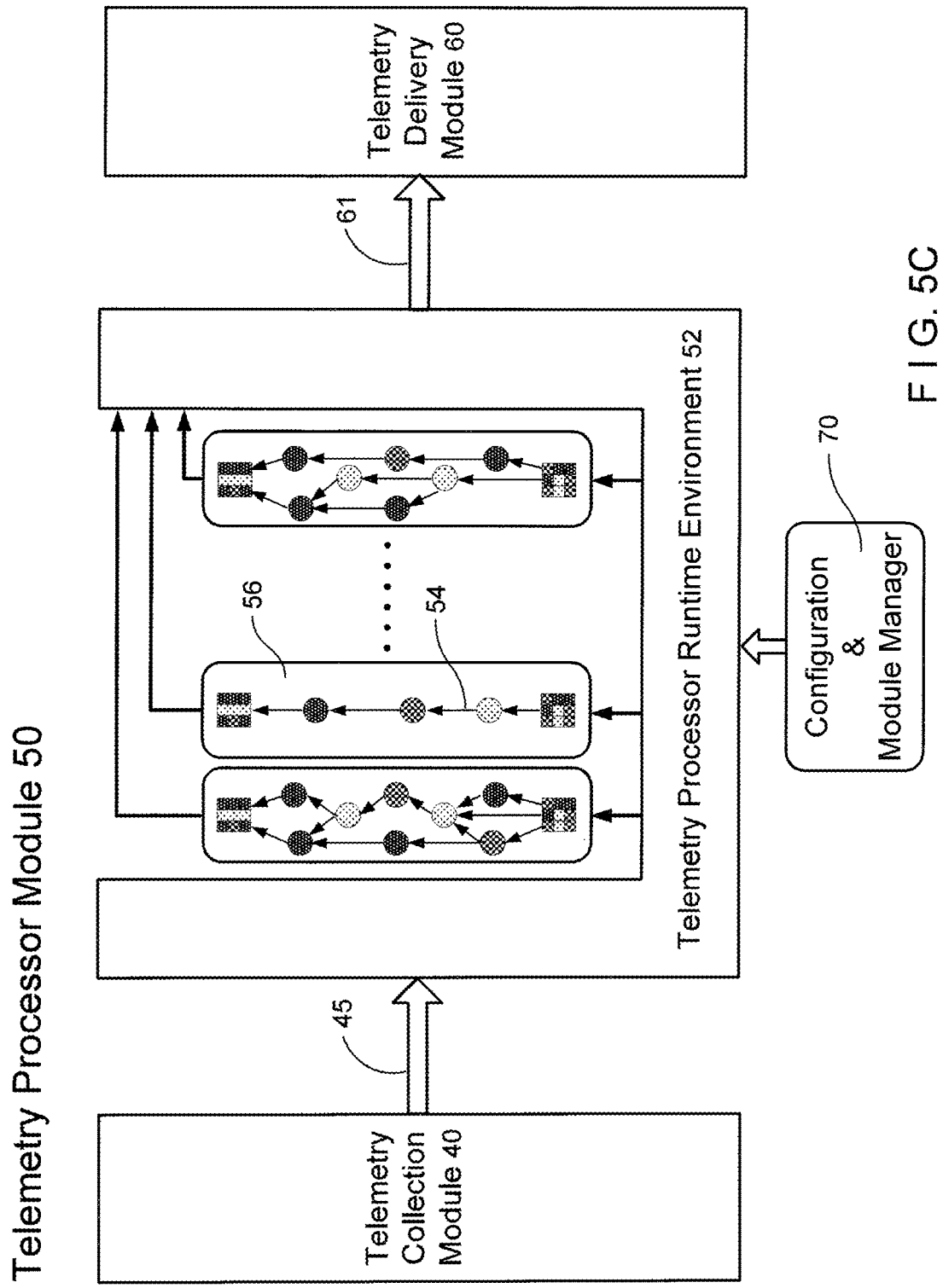
FIG. 5C is a diagram depicting a representative implementation of the high-level architecture and design of the Telemetry Processor Module.

Telemetry Processor Module 50, illustrated in the diagram of FIG. 5C in greater detail, is provided to operate on data-streams by executing algorithms that process the data collected from the one or more continuous telemetry streams. Each data-stream is represented as a tensor data-structure, and the algorithms are executed using the various methods of implementing data-flow computation within one or more processing engines each referred to as a platform execution module. Input data is in the form of one or more telemetry streams (tensor streams) 45 emitted from the Telemetry Collection Module. When computation within the Telemetry Processor Module 50 has completed, output streams emitted from each task-graph are organized into an output tensor data-structure 61 which is then forwarded for delivery by the Telemetry Delivery Module 60.

With respect to the Telemetry Processor Module 50 of FIG. 5C, once the data is collected and organized into the various streams of data, each stream having the requisite elements is organized as a tensor structure. Then, the following options are available: either to deliver a stream to one or more targets, or to deliver the stream to the Telemetry Processor Module. The purpose of the Telemetry Processor Module 50 is to host one or more computational algorithms capable of processing the tensor.

The diagram of FIG. 5C illustrates a run time environment that hosts a set of data flow computational graphs which illustrate multiple tensor streams emitted from the Telemetry Collection Module 40 and injected into a platform execution module of the respective processing module where the tensor stream is operated under the control of the Telemetry Processor Runtime Environment 52. For each tensor stream one or more platform execution modules are provided to operate on a specific telemetry stream. The telemetry stream is a stream of tensors which is a stream of structured data where the structure is a n-dimensional tensor. In the application the terms tensor streams, telemetry streams, or telemetry tensor streams each potentially within a service flow are used interchangeably.

Each tensor stream is fed into the Telemetry Processor Module Runtime Environment 52 where it is then passed into one or more platform execution modules which contains a task graph representing organization of operations that are applied to a particular tensor in real time and a data-flow computation model. FIG. 5C depicts multiple circles, wherein each circle represents an operator, function, or algorithm. The way the circles are organized and connected represent the order or sequence of operations and the method in which the operations are applied. Each telemetry stream, and consequently tensor contained within, is processed in a stream computational manner under the orchestration of the data-flow task graph within the given platform execution module of the respective processing module.

Figure 5D:
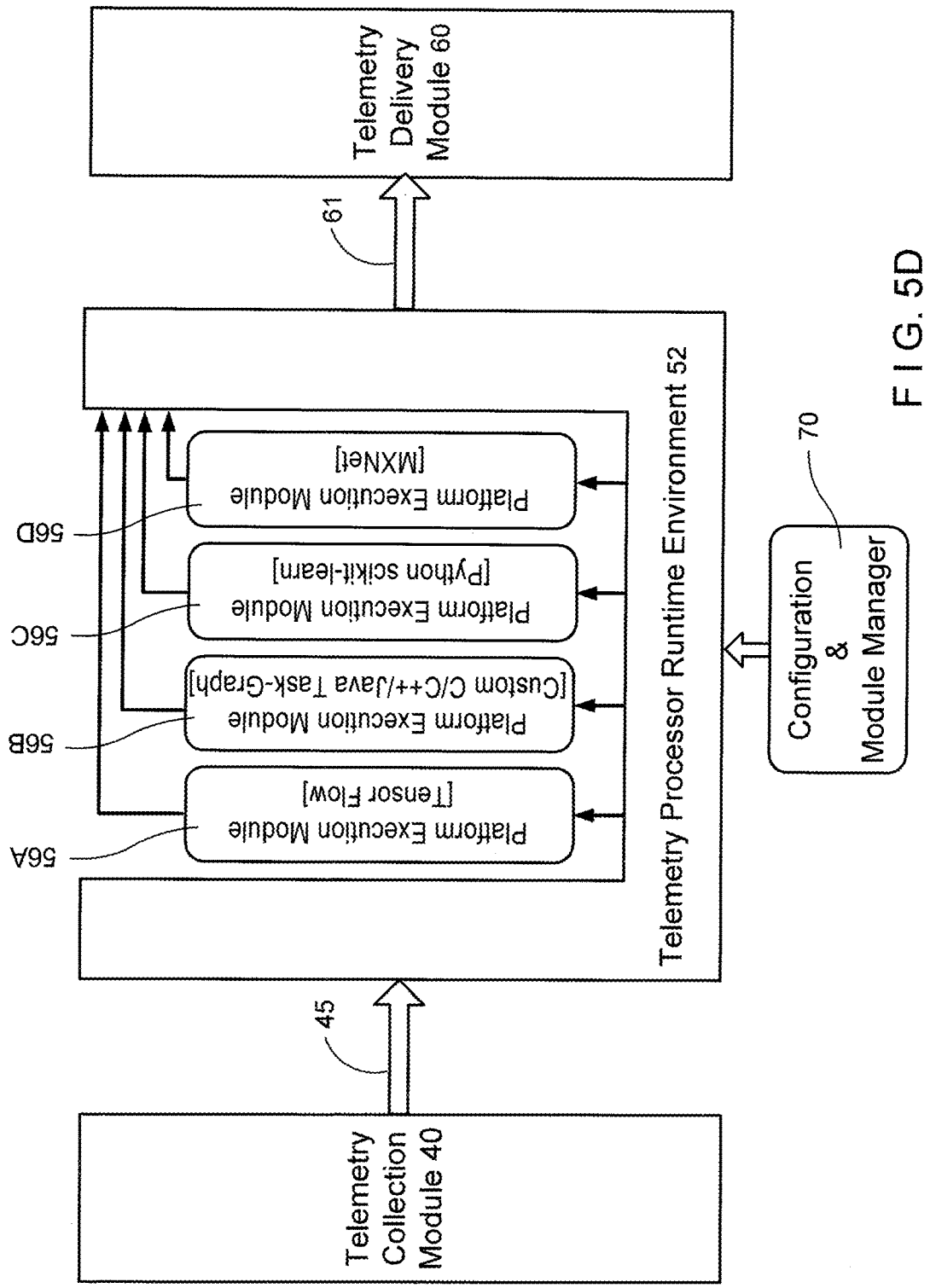
FIG. 5D is a diagram illustrating implementation of a platform execution module.

FIG. 5C illustrates the high-level architecture and design of the Telemetry Processor Module 50. Telemetry streams enter the Telemetry Processor Module from the Telemetry Collection Module 40 (shown at the left-side of FIG. 5C) and are consumed by the Telemetry Processor Runtime Environment 52, where they are directed to one or more platform execution modules shown as arrows 54 leading to multiple platform execution modules. Upon Dynamic Telemetry Agent Platform initialization (typically during boot-up of the embedded device operating system), the Configuration and Module Manager 70 processes its configuration file, defining the operation and behavior of one or more platform execution modules 56. As illustrated in FIG. 5C, the platform execution modules 56 are shown as a set of vertical task-graph blocks hosted within the Telemetry Processor runtime environment 52. Each platform execution module 56 operates independently of one another and consumes only telemetry streams meant for the given module as defined through the configuration and module manager 70. Furthermore, the platform execution modules 56 may differ in implementation if so desired. For example, as illustrated in FIG. 5D, one platform execution module 56A can be implemented as a Google Tensorflow engine, another platform module 56D can be implemented as the MXNet machine learning framework, the platform execution module 56C might instantiate Python scikit-learn as an executable environment, whereas the platform 56B can be implemented as a custom module with a proprietary internal implementation. In the platform 56B tasks may be programmed in C, C++, Scala, Python, Java, or proprietary languages as supported by the underlying platform execution module. It is important to note that Platform execution modules may be implemented within their native framework, as specialized data-flow execution engines, or alternatively follow an imperative style "hardcoded" stream processing implementation without any loss of generality in the present invention, provided their input/output relationships follows the stream oriented data-flow model among processing modules within the agent platform. The examples described are representative and not exhaustive. Numerous other platform execution module implementations are possible, provided they adhere to the telemetry processor runtime environment interface contracts which enforces the underlying streaming architecture and design.

Figure 6:
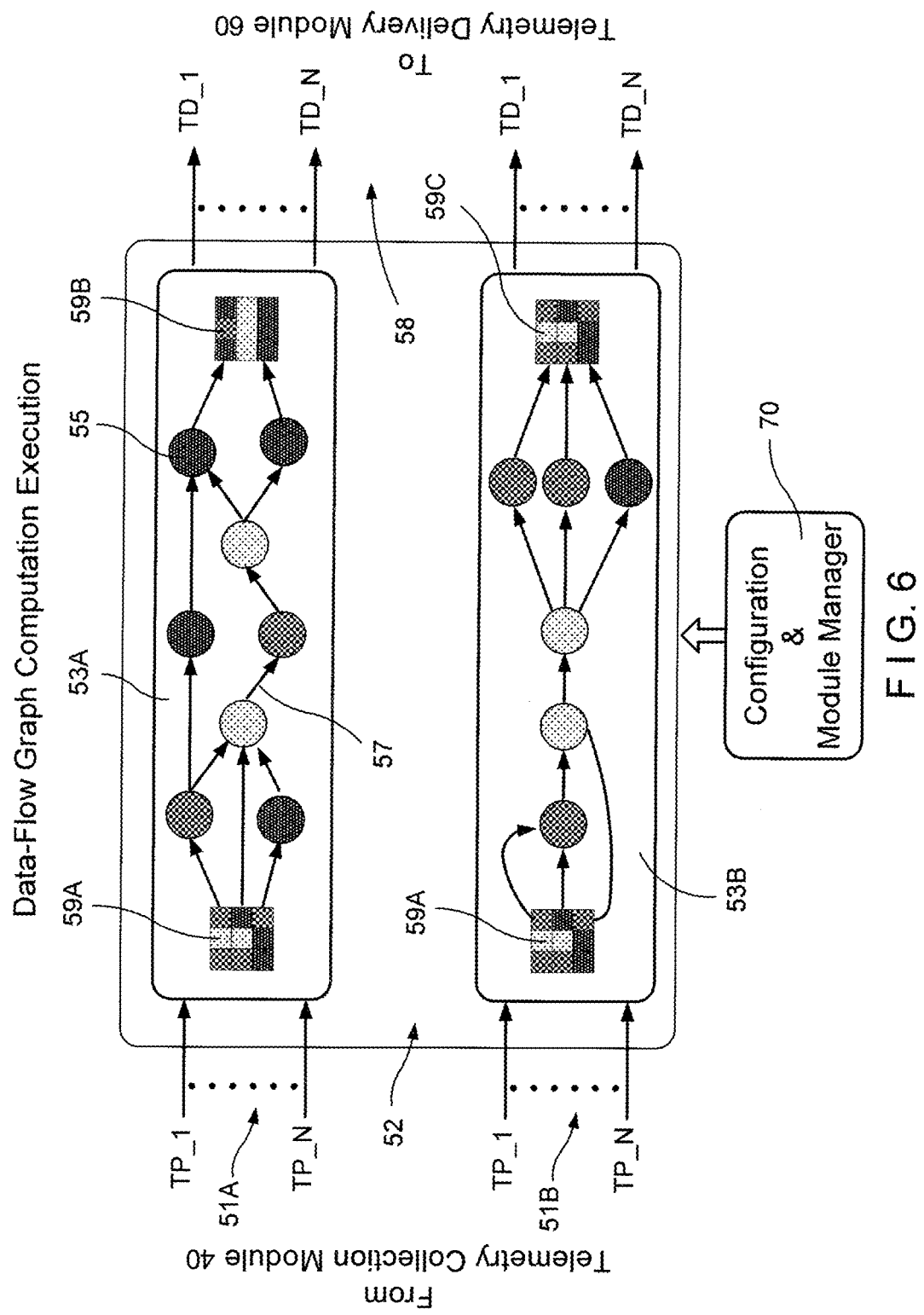
FIG. 6 is a diagram illustrating specific steps executed within the telemetry process of run time environment shown in FIG. 5.

FIG. 6 is an example diagram illustrating specific steps executed within the Telemetry Processor Module run time environment 52 previously shown in FIG. 5C. Left side of FIG. 6 depicts two sets of telemetry tensor streams 51A and 51B shown as TP_1 through TP_N. These are an example of two potentially similar sets of streaming data (in practice each tensor stream is totally different containing different collection entities or service flow mappings), but passing through two different computational pipelines 53A and 53B illustrated in FIG. 6. Within each task-graph, circles 55 represent processing functions. Operations, transformations or more generally the execution of code, or software process to implement an algorithm. Arrows 57 represent communication paths between the respective code functions or execution processes. The cube shaped elements 59A, 59B and 59C represent tensor structures entering the specific processing module (platform execution module) of the Telemetry Processor runtime environment 52, progressing through the given pipeline where operations, transformations, and algorithms are performed on the data values contained within each tensor structure. Once all operations have completed and the end of the task-graph is completed, the given tensor stream is emitted as an output tensor stream 58. In both example computational pipelines 53A and 53B, the tensor structures at the output side are shown to be different from the input side. In the illustrated example, similar/identical tensor structures 59A are entering the Telemetry Processor Module environment 52. However, after passing through the respective computational pipelines 53A and 53B, each tensor structure 59B and 59C is illustrated with a different task-graph topology. The resulting tensor streams are different at the output side of the task-graph, as illustrated by the change in the checker-board pattern of the output tensor stream structures 59B and 59C. Particularly, as illustrated in FIG. 6, the layout of the matrix pattern/configuration of the matrix shown on the left at the input side is identical for both flows. However, at the output shown at the right side of FIG. 6, the layout of the matrix pattern in both flows is different. This illustrates the difference in processing by each of the example telemetry streams by each task-graph shown. FIG. 6 illustrates a representative task-graph or set of operations and their corresponding order of code execution. However, since each task-graph or processing is dynamic and may be updated at any time, the Telemetry Processor Module 50 and the various platform execution modules within, support an infinite set of task-graphs, operations, transformation and computation on each telemetry tensor stream entering the processor module.

FIG. 6 illustrates two different dataflow pipelines 53A and 53B, where two platform execution modules execute two different task-graphs, with telemetry streams entering from the left-side into each respective module, followed by processed telemetry streams exiting from the corresponding right side of the figure. As discussed above, the matrix pattern/configuration of the output telemetry or tensor streams differs, representing two different computations performed on the incoming telemetry data. In all task-graph scenarios, the topology of the graph computation follows a DAG (Directed Acyclic Graph) topology. Other constraints associated to rules for composing the graph computation such as single-input/single-output properties, may be applicable, and are specific to each platform execution module implementation.

Within the Telemetry Processor Module runtime environment 52, each platform execution module contains one or more task-graphs representing operations that a platform execution module may perform on one or more telemetry streams (tensor streams) including the execution of both generalized and specialized algorithms that may be broken down by the following algorithm classes: 1) data mining, transformation, and manipulation, 2) mathematical and symbolic processing, 3) string and data parsing, analysis, encoding [such as one-hot encoding] and transformation, 4) statistical functions including sampling methods such as median absolute deviation methods, 5) data normalization, 6) machine learning and predictive analytics (Supervised and Unsupervised including but not limited to clustering methods, pattern analysis methods, PCA/IPCA, SVD/HOSVD, Lanczos methods, tensor and matrix factorization methods, gradient methods including stochastic gradient descent, linear, logistic, and multivariate regression, neural networks, restricted Boltzmann machines, decision trees, correlation analysis, SVM classification, clustering, K-means, K-NN, HMM/Markov models, and Bayesian networks, 7) encryption, obfuscation, and privacy algorithms (to remove PII as an example), 8) outlier detection, 9) pattern recognizers, 10) anomaly detection, 11) dimensionality reduction, sampling, including sketching, windowing, and 12) generalized algorithms that fall outside the previous ones enumerated provided they can execute within the host system.

A simple example for a generalized algorithm is the trivial case of performing the identity or null function, previously introduced, which simply copies the input telemetry stream to output with contents unchanged. The task-graph in this case is practically a mapping node which accepts inputs from the Telemetry Collection Module 40 and emits outputs to the Telemetry Delivery Module 60. An elaboration of this example utilizes configuration rules to assert an arbitrary X→Y data model schema transformation, or even sampling according to a defined sketching rule (on-the-fly) on the continuous telemetry stream as it evolves over time. As a more complex example, consider the class of algorithms for detecting a threshold or patterns of interest within one or more telemetry streams. The task-graph computation would implement the necessary functions to detect thresholds and/or patterns of interest with corresponding output messages. Output delivery can target the native application or system software as destinations, that react to the output messages by actuating a remediation process. This process can be local to the agent (in cases where the processed data is delivered to a locally executing monitoring and self-healing agent) or to a remote service whereby the remote service is utilizing the processed data for operational monitoring and management of devices. As a final example, multiple telemetry streams representing user behavior of the device or application environment might be pre-processed, then delivered to multiple destinations where subsequent analytics or viewership measurement and analysis is performed. Numerous examples can be constructed from the algorithms defined above given the inherit capability to input multiple data streams, execute reconfigurable and dynamic program code or algorithms and emit for delivery all within a single generalized platform execution module framework. The preceding examples illustrate how the invention can be utilized to provide collection and processing of telemetry resulting in enriched telemetry associated to one or more services that utilize the enriched data, each residing at the same or different destination end-points.

The actual execution of the processing code occurs within a specified platform execution module that operates within the Telemetry Processor Module Virtual Machine Environment. The Telemetry Processor Virtual Machine Runtime, is designed to host one or more platform execution modules which define the way and methodology of implementing both the algorithmic structure (implied task-graph or imperative, or hybrid) and software development environment (C/C++, Java, Python, Scala, etc.). The function of the virtual machine is to host one or more platform execution modules within the agent platform environment, and act as an interface to the Telemetry Collection and Delivery Modules, effectively handling all IPC between modules while providing API's to the platform execution modules in a uniform and consistent manner to ensure tensor streams can be consumed, processed, and output in a consistent and normalized fashion. The virtual machine manages the lifecycle of the platform execution modules. The lifecycle includes telemetry stream routing and buffering, execution module activation, deactivation, execution, termination, dynamic code update, management, targeting and versioning. Code management is dynamic and under the control of the Telemetry Processor Virtual Machine Runtime specified through the Configuration and Module Manager. Code may be static (built-in to the telemetry agent code-image and updated if a newer version is available) with dynamic update, or fully dynamic and accessed at run-time (code accessed from the Cloud). Since the end-to-end system follows a data flow, stream oriented model, streams are may need to be buffered between objects, to allow for real-time code updates that occur without loss of data provided that sufficient buffering is defined in configuration. To minimize data loss during system failures or reboots, the design allows for telemetry stream check-pointing at the collection and delivery modules, provided there is local flash or storage available.

The virtual machine runtime optimizes memory and CPU performance by carefully managing memory (eliminate unnecessary copy operations) and code execution so reuse of pre-computed results are shared across task-graphs wherever possible. The platform execution modules are dynamic, built on industry standard library's and runtime environments mentioned earlier in order to simplify development of telemetry processing functionality. The design is also not limited, as proprietary platform execution modules may be designed and literally dropped into the telemetry processor virtual machine environment (provided the platform execution module implementation follows the virtual machine interface contract).

To summarize, the Telemetry Processor Module 50 supports the execution of a wide-range of algorithms on continuous streams of in-coming data based on the data-flow model of computation. Results of computation are streamed into the Telemetry Delivery Module 60 for delivery to one or more destinations. To provide maximum flexibility and dynamic operation, a virtual machine environment implements a run-time container for one or more processing pipelines referred to as platform execution modules. Platform execution modules may be based on industry leading environments such as Tensorflow, Python scikit-learn, MXNet, or Theano, to name a few, or customized modules as required. Platform execution modules all must follow a well-defined interface contract with the runtime environment in order to allow for dynamic code module operation and management.

Figure 7:
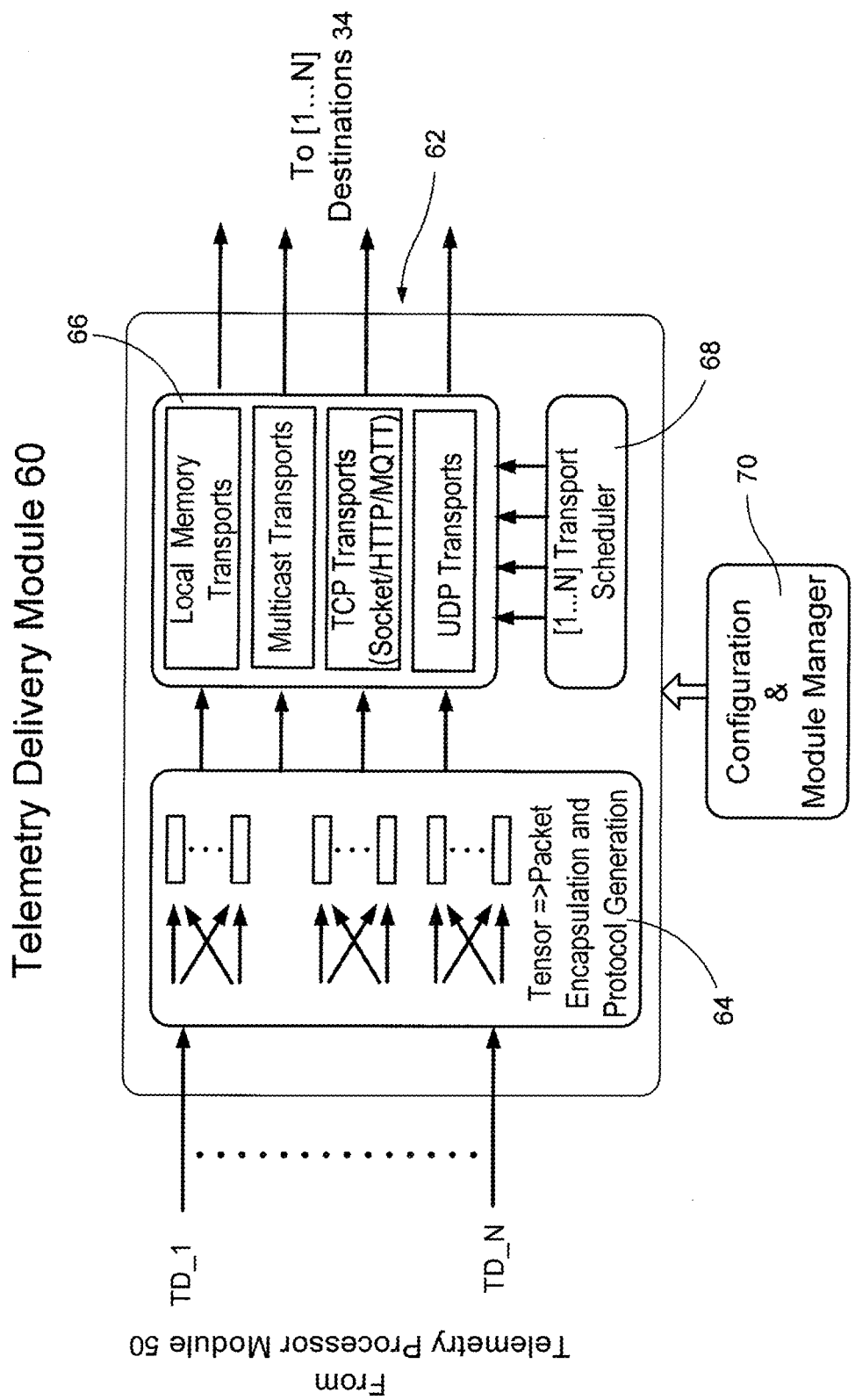
FIG. 7 is a diagram depicting semi-exploded view including architecture and design of the Telemetry Delivery Module.

FIG. 7 depicts a semi-exploded view of the Telemetry Delivery Module 60, showing different telemetry streams, containing processed data, coming from the Telemetry Processor Module 50, transformed within the Telemetry Delivery Module 60, and showing multiple delivery streams 62 exiting to the right of the figure. On the left side of FIG. 7 a block 64 of Tensor Packet Encapsulation and Protocol Generation module is illustrated. Essential aspects of the functionality of the module/block 64 include taking/accepting the tensors, stripping them apart and organizing the tensors to facilitate their transmission over the communications network. The communications network is represented as multiple/different types of programmable communication paths. On the right side of FIG. 7 a block 66 containing various transports are depicted, such as local memory transports, multicast transports, TCP transports, (which could be Sockets, HTTP or MQTT messaging), and UDP transports which is a part of TCP network.

FIG. 7 depicts a semi-exploded diagram of the Telemetry Delivery Module 60, wherein different telemetry streams containing processed data coming in from the Telemetry Processor Module 50, followed by conversion to a packetized format within a configurable set of protocol handlers for delivery to one or more destinations. According to the illustrated architecture and design, the Telemetry Delivery Module 60 accepts one or more telemetry data streams from the Telemetry Processor Module 50, transforms each stream into the appropriate network delivery format, and transmits each stream to one or more specified destinations 34.

Operation of the Telemetry Delivery module 60 is as follows. Tensor streams are first reorganized as defined through configuration into a final delivery stream for the given telemetry stream target which may be associated with one more unique service flows, then encapsulated into a packet/protocol format (such as HTTP, or MQTT packet formats) that matches the destination target requirements. The Telemetry Delivery Module 60 supports an extensible set of transport handlers each of which manages the actual delivery of telemetry streams. Examples include support for UDP, TCP including socket, Multicast, HTTP, and MQTT transports, as well as local memory IPC in cases where the destination target is another process (system, operating system, driver, middleware) or application within the same device inclusive of the telemetry agent platform itself.

The collection of transport handlers that are active can be configured during initialization by the Configuration and Module Manager 70 shown at the bottom portion of FIG. 7. Additionally, transport handlers can be updated and new ones added or removed dynamically to support changes or new features.

The delivery behavior of each transport handler is managed by a Transport Scheduler 68 whose responsibility is to activate the delivery of telemetry streams to one or more targets according to a configurable frequency considering bandwidth and destination target characteristics as to optimize the overall performance of the system and network. The Transport Scheduler 68 can direct each transport to operate either in synchronous or asynchronous mode of operation depending on the underlying transport protocol (e.g. TCP versus MQTT/UDP). One other function of the Transport Scheduler 68 is to monitor delivery failures and recover through retransmissions and the use of configurable back-off algorithms in conjunction with Telemetry Agent telemetry stream caching or buffering that can be optimized for any given network and system.

Figure 8:
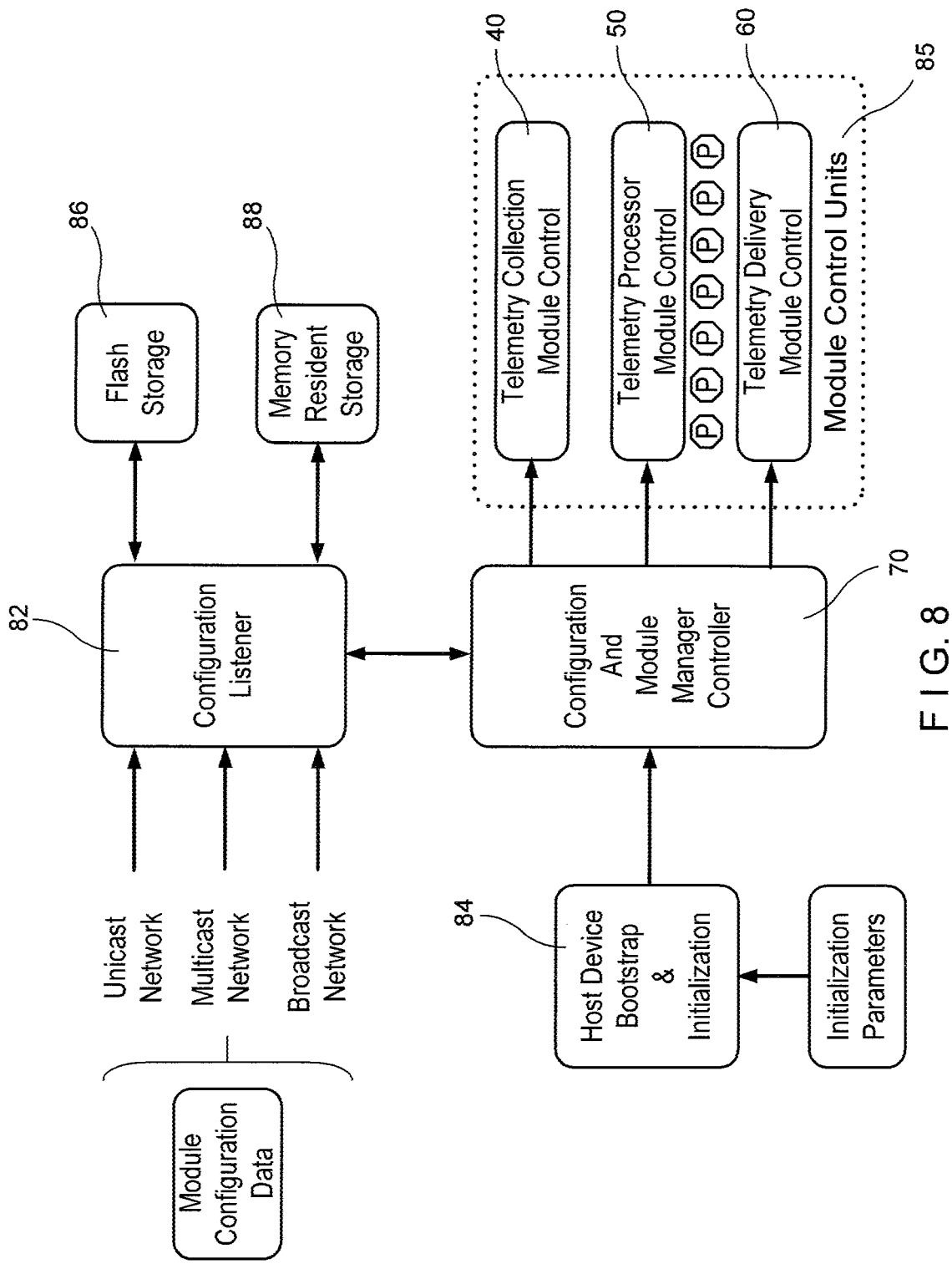
FIG. 8 is a diagram depicting configurable behavior of the Telemetry Delivery Module managed by the Configuration and Module Manager.

FIG. 8 is a diagram depicting the overall architecture of the configuration and initialization framework. FIG. 8 Depicts the configurable behavior of the Telemetry Delivery Module 60 managed by the Configuration and Module Manager 70. When operation of the system is initiated, initialization occurs as follows: First, the host system (a device that the software is running on) starts up/activates a listener, which is searching/looking for information coming from the network side. The system is fully dynamic. Thus, if the Processor Module 50 is replaced or different criteria is loaded for any aspect of the system it will be possible to configure the system remotely. The top area of FIG. 8 depicts a configuration listener 82 that is searching for updated parameters that overwrite the defaults. Once the updated parameters are received from any of different communication mechanisms, then a configuration listener stores those communication mechanisms and activates various Module Control Units 85 depicted at the lower portion of FIG. 8. These units are the telemetry modules including: a collection module 40, processor module 50, and the delivery module 60. As depicted in FIG. 8, the communication mechanisms can be unicast (a regular network), multicast or broadcast networks.

Each module within the Telemetry Agent Platform is controlled by the global Configuration and Module Manager 70 which is made up of three main functional units as shown within the dotted line region of FIG. 8: Telemetry Collection Module Control 40, Telemetry Processor Module Control 50 and Telemetry Delivery Module Control 60. The Configuration and Module Manager Controller 70 is responsible for the operation of the Configuration Listener 82 and the Module Control Units based on initialization parameters processed at start-up of the Configuration and Module Manager subsystem during host device operating system bootstrap (typically launched as a background process) and initialization.

Operation of the Configuration and Module Manager 70 is as follows. Initially, the host system bootstrap process 84 launches the Configuration and Module Manager process with initialization parameters that include memory resource allocations, number of threads to utilize, configuration information required by the Configuration Listener 82 (such as network type, and addresses and ports to bind to) and Module Control Units (memory allocations, number of threads, etc.) and configuration information that is utilized by the Configuration and Module Manager to code update itself.

Further, the Configuration and Module Manager Controller 70 starts and initializes the Configuration Listener 82 and each of the three Module Control units 85. Based on configuration, the Configuration and Module Manager Controller 70 starts the Configuration Listener 82, which in turn, starts one or more listener threads to receive configuration data and commands from the network. The Configuration Listener 82 also checks and compares versioning of any locally stored configuration files with that stored remoted, and updates the locally stored configuration in flash 86 (if available) according to any rules defined during initialization. The most up to date configuration files are stored in memory 88 for fast access. The ongoing operations of each module is orchestrated by the Configuration and Module Manager Controller 70 by either the configuration received during bootstrap or real-time commands received by the Configuration Listener 82 and passed on to the Configuration and Module Manager Controller 70 for processing. Examples of commands include individual module lifecycle operation for activation and targeting, as well as and dynamic code update instructions for each component or module of the Telemetry Agent platform.

Sill further, based on configuration, the Configuration and Module Manager Controller 70 starts each of the Module Control units 85, which access the latest version of per-module configuration files to drive the per-module configuration and operation described in earlier sections. Dynamic operation of the Telemetry Agent platform is supported through commands interpreted by the Configuration and Module Manager 70 resulting in behavioral or operational changes to each component of the platform.

Figure 9:
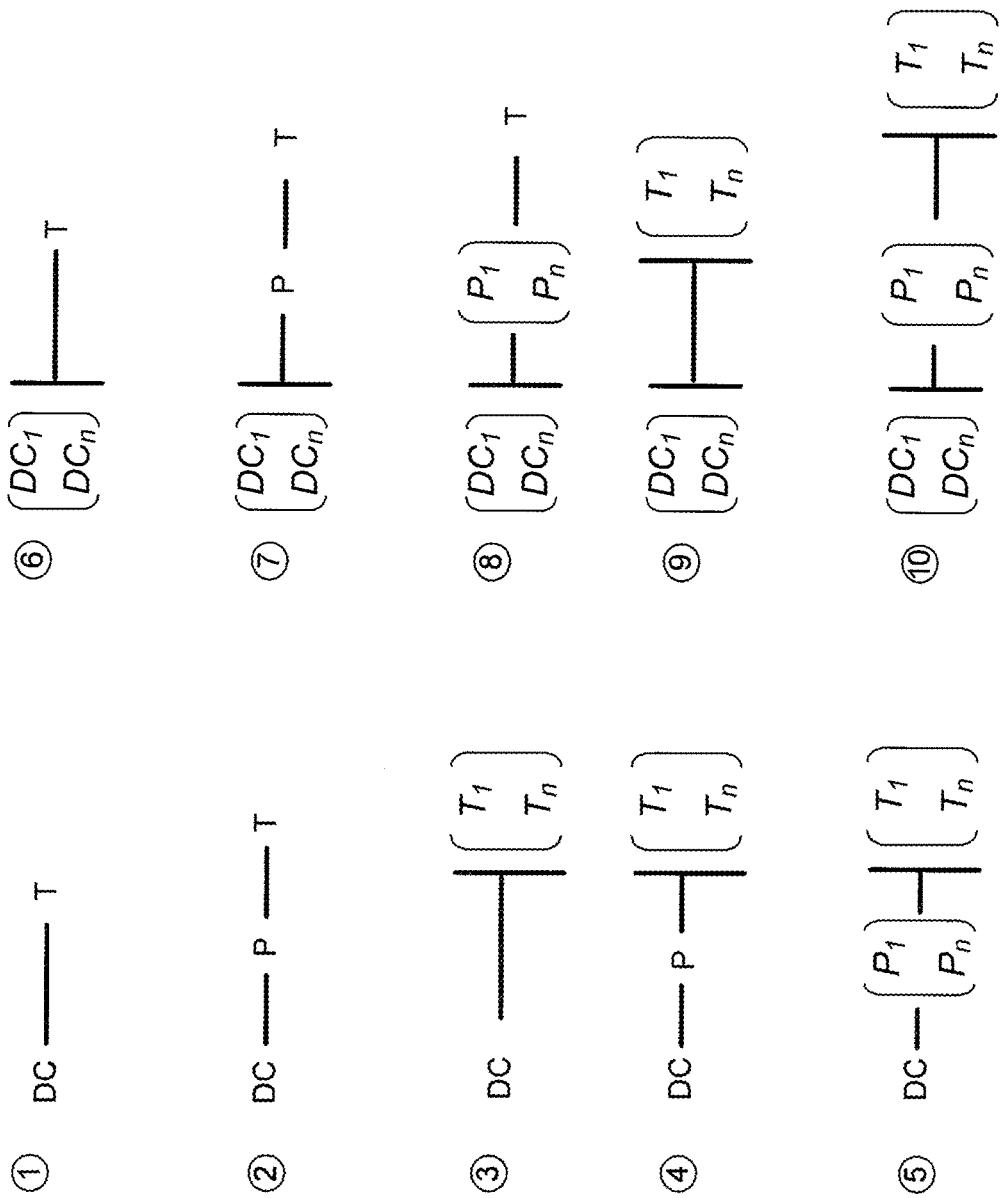
FIG. 9 is a diagram illustrating a plurality of data-collection, processing, and delivery flows showing various permutations associated with collection, processing, and delivery telemetry data (items in parenthesis represent permutation functions on one of data-collection, processing, or delivery targets).

This section describes the telemetry agent platform data collection, processing and delivery pipeline and multi-service architecture. FIG. 9 illustrates a flow network representation illustrating the various permutations associated to collection, processing, and delivery telemetry data. That is, a symbolic representation of one or more telemetry tensor stream flows from collection, processing, through delivery to one more target destinations. The figure expresses telemetry agent platform operation in terms of a left-to-right execution pipeline of; single data-collection assembly (DC) or sets or multiples of data-collection assemblies ($DC_1$-$DC_n$); single processing units (P) or multiple processing units ($P_1$-$P_n$); and delivery targets, where a single delivery target is defined as T, and multiple targets similarly $T_1$-$T_n$. Additionally, the ( ) surrounding any given entity defines the permutation operator signifying that any organized collection of D, P, or T entity sets may be permitted. For clarity, an assembly is simply one or more data elements collected by the Telemetry collection module into a single logical data-collection stream.

Items 1-5 in FIG. 9 represent a single data-collection entity set processed as follows in order of figure.
1. Single data-collection set delivered to single target.
2. Single data-collection set, processed by a single processing unit (one task-graph), then delivered to single target.
3. Single data-collection set, delivered to permutation of one or more targets.
4. Single data-collection set, processed by a single processing unit, then delivered to permutation of one or more targets.
5. Single data-collection set, processed by multiple processing units, then delivered to permutation of one or more targets Items 6-10 in FIG. 9 represent permutations of data-collection assemblies or multi-sets of collected entities, optionally processed then delivered to their respective targets.
6. Pet mutation of one or more data-collection assemblies to a single target.
7. Permutation of one or more data-collection assemblies, processed by a single processing unit (one task-graph), then delivered to single target.
8. Permutation of one or more data-collection assemblies, processed by a permutation of processing units (zero, one or more task-graphs), delivered to a single target.
9. Permutation of one or more data-collection assemblies, delivered directly permutation of one or more target.
10. Permutation of one or more data-collection assemblies, processed by a permutation of processing units (zero, one or more task-graphs), delivered to permutation of one or more target. This is the most generalized form. The telemetry agent platform supports service and multi-service data-collection, processing, and delivery to one more targets as described previously and illustrated in FIG. 9.

With this methodology, a service oriented, multi-service architecture for collecting data or multiple data-sets, potentially processing zero, one or more rules or algorithms against said data or data-sets, and delivery of resulting data in the form of enriched telemetry to one or more processes, service or multi-services is realizable.

A service or multi-service refers to any collection, composition, distributed or not, of computing operations (including but not limited to executing system processes, applications, and software programs) that produce a result independent of the way the service or multi-service is fulfilled (delivered). Within the present invention, service and multi-service(s) are logically represented by one or more virtual data streams (overlapping or non-overlapping), whose destination targets are actual subscribing service or multi-services, that may execute on one or more processors or cores within a device, as part of a distributed network of devices, server, data center, private, hybrid or public cloud infrastructure, and more generally, any software code, including but not limited to the invention herein.

Each data-collection assembly, or telemetry stream may be mapped to zero, one or more services, each of which may be consumed by one or more destination targets in arbitrary permutations. In this manner, each telemetry stream is associated with a virtualized service that may be implemented as an operating system process, system, or user application on the locally executing platform, a remote cluster of computing devices, or executing across a distributed network of computing devices inclusive of cloud computing software, systems, and services. The type and number of services includes, but is not limited to in any form of functionality such as: device, software, system, network, application operational management and monitoring; user and audience behavior analysis, analytics, visualization, and reporting; content delivery including content targeting as found in advertising, management of content distribution such as CDN networks, web, mobile, interactive, and video distribution and consumption. Application and platform services for the enablement of data analytics and machine learning, security, privacy, operational management and monitoring, advanced advertising, targeted advertising, and any consumer (software process) of data required in the enablement or delivery of some service or functionality.

The diagram of FIG. 10A depicts the service architectural model representation of the Dynamic Telemetry Agent Platform system of the invention. The block on the left side of FIG. 10A represents the Telemetry Collection Module 40, the block in the middle portion represents the Telemetry Processing Module 50, whereas the block at the right side represents the Telemetry Delivery Module 60. Multiple data entities at the bottom of FIG. 10A are identified as D1 through D100. At the Telemetry Collection Module 40, three telemetry streams having different entities are shown. The top stream SVC3 is shown with entities D1, D2; the middle stream SVC2 is shown with D4, D9 entities; whereas the bottom stream SVC1 is shown with entities D85, D86 and D100. These streams are shown to be organized as continuous streams of tensor data structures, implemented as the tensor streams or the telemetry streams. In the Telemetry Processor Module 50, the telemetry streams are being processed by elements P1, P2 and P3. As to the Telemetry Delivery Module 60, the streams are being delivered to various targets, in the following manner: top stream is delivered to targets T1, T5; middle stream to the target T8, and the bottom stream to the target T9. FIG. 10A illustrates an association between a service running on target T9, a service running on target T8 and a service running on targets T1 and T5. These services relate to the actual data elements collected at the telemetry collection module. Again, each data block at the Telemetry Collection Module 40 is associated with the respective services. FIG. 10A shows service SVC1 depicted under the data entities 85, 86 and 100; service SVC2 depicted under the data entities D4 and D9, and service SVC 3 under the data entities D1 and D2.

Figure 10B:
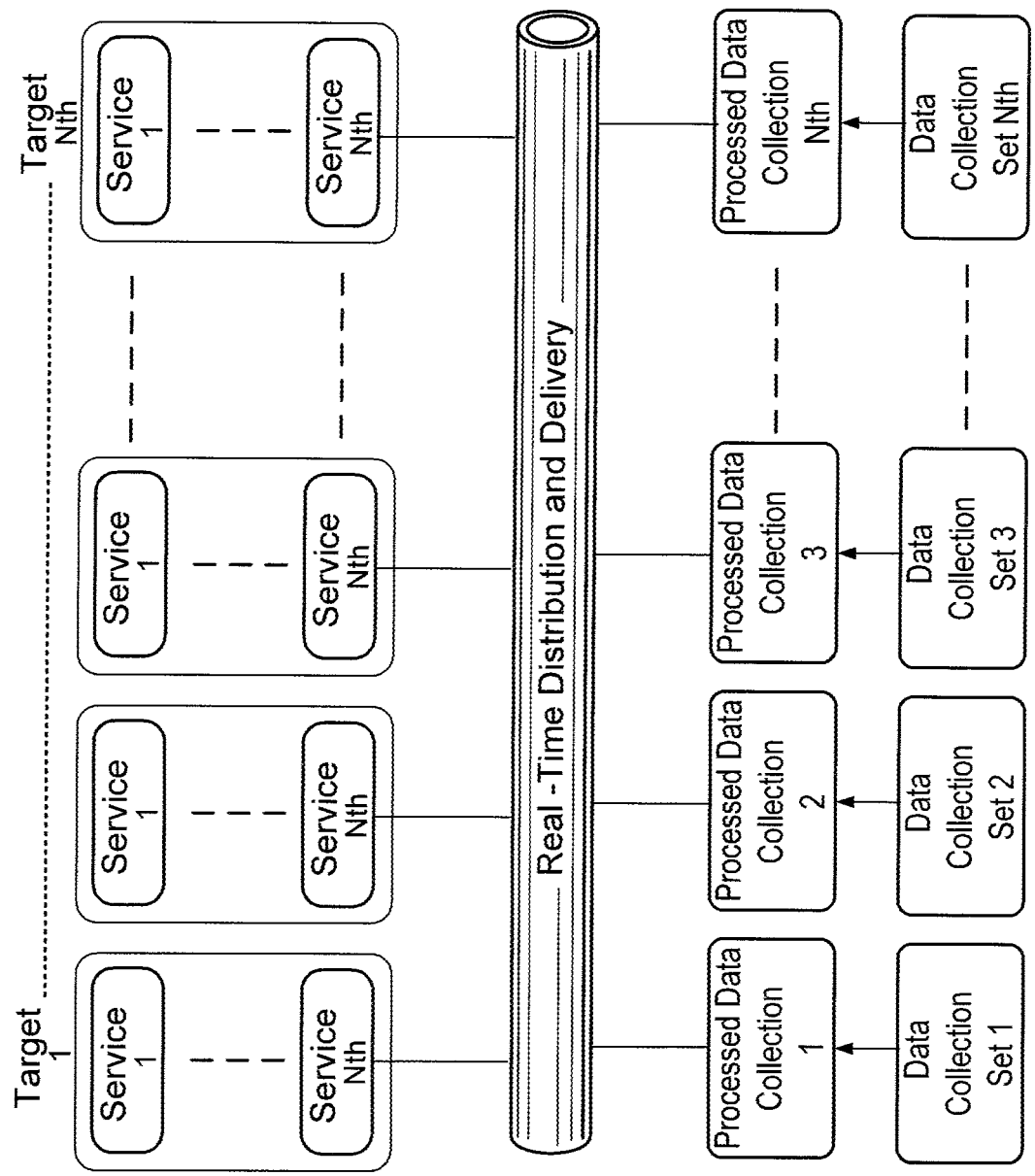
FIG. 10B is a diagram illustrating the concept implementation of the present invention in terms of multiple services each aggregating and organized as a set of telemetry data appropriate to that service, processed, and delivered to targets aggregated and organized by service.

FIG. 10B is a diagram illustrating a multi-service nature of the architecture. The consumers of the telemetry streams are typically services. Examples of such services are: advanced advertising infrastructures, cloud computing infrastructures, etc. Thus, since a telemetry stream is provided, it is possible to view such telemetry stream as a virtual telemetry service pipeline that is directed to a target or a service that consume such telemetry stream.

The diagram of FIG. 10B discloses the telemetry services oriented architecture where various data collection sets, which are shown at the bottom of the diagram as data collection Set 1 through Set Nth, are provided and processed (see Processed Data Collection 1-Nth) with real time distribution and delivery. Then, each processed data collection flow is associated to the corresponding sets of services (shown at the top of FIG. 10B as Service 1 through Service Nth) contained within any given destination target illustrated as Target 1 through Target Nth. FIG. 10B illustrates the highly configurable service flow oriented dynamic telemetry collection, processing, and delivery. An essential aspect of the collection framework is the ability to map a universe of data entities into multiple data sets that are associated and identified through a service flow and to organize them as tensor data structures so any given delivery target may consume a configurable set of data collection entities on a unique set of services, by service type.

The bottom area of FIG. 10B illustrates one or multiple sets of data telemetry collections or assemblies and associated processing as previously defined. Each target contains one or more services labelled Service 1-Service N, consuming telemetry streams mapped and associated to the corresponding service. The mapping occurs at the time the given data-collection assembly is associated to a given target. The mapping tuples between a given telemetry stream, its set of targets and corresponding services that are all configurable and dynamic allowing for maximum flexibility. Moreover, since a telemetry streams may be overlapping or non-overlapping in terms of their data-collection assembly contents, telemetry streams can be directed to different service recipient in a fully independent and configurable manner.

FIG. 10B depicts a highly configurable, dynamic telemetry collection processing delivery framework that allows for multiple services that associate the data sets to the respective services at the delivery end point. As an example of the utility of this design capability one telemetry stream may contain a data collection set related to audience measurement activity of a user, such as channel tuning or content selection in some content viewing device. This collection of data, delivered as a telemetry stream may exist in service flow #1. A second telemetry stream may contain entities representing a data collection set associated to network, device, system, and application operational behavior, measurements, or metrics. This second telemetry stream may be defined as service flow #2. These service flows may be delivered to different delivery targets or in any other combination. Other data collection sets can be arbitrarily created, associated to one or more service flows with delivery to any permutation of destination targets as represented in FIG. 10B.

What is claimed is:

1. A method of providing a unified data-flow execution pipeline to multiple targets, by a configurable data collection, processing, and delivery system, said method comprising the steps of:

collecting, from multiple heterogeneous sources, at least two of said multiple sources being of different types, multiple data collection sets defined by the data available to the system, at least two of the multiple data collection sets being of different types;

organizing said multiple data collection sets into at least one unified N-dimensional tensor based telemetry data stream without loss of quality or generality, said telemetry data stream being associated with at least one service flow, each of said at least one service flow being a virtual data stream associated with a unique service identifier;

dynamically configuring at least one execution module, which forms part of said configurable data collection, processing, and delivery system and operates independently of other execution modules, in real time, based on said collected multiple data collection sets and on said at least one telemetry data stream and said at least one service flow organized therefrom;

processing said at least one telemetry data stream and said at least one service flow by said at least one execution module to execute a set of operations, transformations, and algorithms on said at least one telemetry data stream; and further processing said at least one processed telemetry data stream to form multiple target destination delivery streams, each of said multiple target destination delivery streams adhering to transport characteristics and to a transmission process required by at least one of said multiple targets and is ready for delivery to at least one of said multiple targets, wherein said multiple targets include at least two targets having different transport characteristics or different transmission processes, and wherein said multiple target destination delivery streams include at least one target destination delivery stream adhering to each of the different transport characteristics or different transmission processes.

2. A method of claim 1, wherein said collecting is carried out by a configurable telemetry collection module forming part of said configurable data collection, processing, and delivery system, and wherein said collecting said multiple data collection sets comprises the steps of:

dynamically configuring said configurable telemetry collection module to collect specific data entities, said dynamically configuring of said telemetry collection module including configuration of multiple criteria, including a time schedule, a frequency, data entity values and thresholds, statistical profiles, and sources and targeting of said data entities, said dynamically configuring being based on fuzzy or probabilistic logic methods and on regular expression methods;

using said configured telemetry collection module, collecting said multiple data collection sets and normalizing data therein into said at least one unified N-dimensional tensor based telemetry data stream, without loss of quality or generality of the data;

associating said tensor based telemetry data stream with at least one service flow identifier, thereby to associate a service flow mapped to said service flow identifier with the respective telemetry stream data stored in said tensor based telemetry data stream; and streaming said tensor based telemetry data stream associated with said at least one service flow to said at least one execution module for further processing.

3. A method of claim 2, wherein said collecting and normalizing data comprises the steps of:
collecting raw telemetry data from said multiple sources by the telemetry collection module;
normalizing and re-encoding said collected raw telemetry data into respective formats; and
reorganizing said normalized and re-encoded telemetry data into at least one said tensor based telemetry data stream associated with said unique service identifier.

4. A method of claim 2, wherein said at least one execution module forms part of a configurable telemetry processor module forming part of said configurable data collection, processing, and delivery system, and wherein said processing said at least one telemetry data stream and said at least one service flow comprises the steps of:
streaming said at least one telemetry data stream, according to said at least one service flow associated therewith, from said configurable telemetry collection module to said configurable telemetry processor module;
executing a configurable and dynamic runtime virtual arrangement/machine hosting said at least one execution module operating on said at least one telemetry data stream, thereby to execute algorithms on said at least one telemetry data stream in a data-flow streaming model used by said at least one execution module; and
processing said at least one telemetry data stream based on said at least one service flow associated therewith.

5. A method of claim 4, wherein said algorithms are defined in a task execution graph, which task execution graph has a dynamic structure.

6. A method of claim 5, wherein said execution module supports a multiplicity of platforms and algorithms.

7. A method of claim 4, further comprising, prior to said executing said configurable and dynamic runtime virtual arrangement/machine, using a configuration and module manager forming part of said configurable data collection, processing, and delivery system, processing a configuration file associated with said at least one execution module to define operation and behavior characteristics of said at least one execution module.

8. A method of claim 7, wherein said at least one execution module comprises multiple execution modules, each specific execution module operating independently of each other execution module, and processing only telemetry data streams predetermined for said specific execution module, according to characteristics defined by said configuration and module manager, wherein different ones of said multiple execution modules differ in implementation.

9. A method of claim 2, wherein said method further comprises the step of organizing collection, processing, and delivery of data into said at least one service flow, said at least one service flow comprising a plurality of data collection entities organized as at least one set of data entity combinations.

10. A method of claim 9, wherein said at least one set of data entity combinations processed and delivered in a combination specific to at least one target which consumes telemetry associated with the set of service flows received by said at least one target.

11. A method of claim 1, wherein said configurable data collection, processing, and delivery system further includes a configurable telemetry delivery module, and wherein said further processing said at least one processed telemetry data stream comprises the step of:

converting each of said at least one processed telemetry data stream, by said configurable telemetry delivery module, into an appropriate data format deliverable according to delivery characteristics of a delivery channel to a respective destination target device or service end-point of at least one of said multiple targets; and
transmitting each of said at least one converted processed telemetry data stream to at least one said destination target device or service end point,
wherein said data format is configured from a set of data formats according to said delivery characteristics of a delivery channel used for delivery of said at least one processed telemetry data stream.

12. A method of claim 11, wherein said converting further comprises the steps of:
reorganizing a tensor structure associated with each of said at least one processed telemetry data stream into a final delivery stream suitable for delivery to at least one said destination target device or service end point associated with said at least one service flow of said tensor; and
encapsulating said at least one processed telemetry data stream into a packet/protocol format matching requirements of said at least one said destination target device or service end point,
wherein said telemetry delivery module supports multiple transport handlers, each of which manages actual delivery of telemetry streams.

13. A configurable data collection, processing, and delivery system implementing a unified data-flow execution pipeline in collection, processing and delivery of data to multiple targets, said system comprising:
multiple network interfaces or input/output (I/O) interfaces;
at least one processor; and
a non-transitory computer readable storage medium for instruction execution by said at least one processor, said non-transitory computer readable storage medium having stored:
instructions to collect, from multiple sources, at least two of said multiple sources being of different types, multiple data collection sets from data available to said system, at least two of the multiple data collection sets being of different types;
instructions to organize said collected multiple data collection sets into at least one unified N-dimensional tensor based telemetry data stream without loss of quality or generality, said telemetry data stream being associated with at least one service flow, each of said at least one service flow being a virtual data stream associated with a unique service identifier;
instructions to dynamically configure at least one execution module, which forms part of said configurable data collection, processing, and delivery system and operates independently of other execution modules, in real time, based on said collected multiple data collection sets and on said at least one telemetry data stream and said at least one service flow organized therefrom;
instructions, included in said at least one execution module, to process said at least one telemetry data stream and said at least one service flow, to execute a set of operations, transformations and algorithms on said at least one telemetry data stream; and
instructions to further process said at least one processed telemetry data stream to form multiple target destination delivery streams, each of said multiple target destination delivery streams adhering to transport characteristics and to a transmission process required by at least one of said multiple targets and is ready for delivery to said at least one of said multiple targets, wherein said multiple targets include at least two targets having different transport characteristics or different transmission processes, and wherein said instructions to further process including instructions form said multiple target destination delivery streams to include at least one target destination delivery stream adhering to each of the different transport characteristics or different transmission processes.

14. A system of claim 13, wherein said instructions to collect multiple data collection sets are included in a configurable telemetry collection module, and include:

instructions to dynamically configure said configurable telemetry collection module to collect specific data entities according to a time schedule;

instructions to collect said multiple data collection sets and to normalize data therein into said at least one unified N-dimensional tensor based telemetry data stream without loss of quality or generality of the data; and instructions to associate each said tensor based telemetry data stream with at least one service flow identifier, thereby to associate a service flow mapped to said service flow identifier with the respective telemetry data stream stored in said tensor based telemetry data stream.

15. A system of claim 14, wherein said at least one execution module forms part of a configurable telemetry processor module, and wherein said instructions to process said at least one telemetry data stream and said at least one service flow comprise:

instructions to stream said at least one telemetry data stream, according to said at least one service flow associated therewith, from said configurable telemetry collection module to said configurable telemetry processor module;

instructions to execute a configurable and dynamic run-time execution virtual machine/arrangement hosting said at least one execution module operating on said at least one telemetry data stream, thereby to execute algorithms on said at least one telemetry data stream in a data-flow streaming model used by said at least one execution module; and instructions to process at least one telemetry data stream based on said service flow associated therewith.

16. A system of claim 15, wherein each said algorithm is defined in a task execution graph, which task execution graph has a dynamic structure, and wherein said execution module supports a multiplicity of platforms and algorithms.

17. A system of claim 15, wherein said instructions to further process are included in a configurable telemetry delivery module, which include:

instructions to convert each of said at least one processed telemetry data stream into an appropriate data format deliverable over a delivery protocol type to a respective destination target device or service end-point of at least one of said multiple targets, said instructions including instructions to configure said delivery protocol type from a set of delivery protocol types according to at least one of transmission frequency, duration and bandwidth control.

18. A system of claim 14, wherein said non-transitory computer readable storage medium further has stored:

instructions to organize the collection, processing, and delivery of data into said at least one service flow, said at least one service flow comprising of a plurality of data collection entities arranged as at least one set of data entity combinations, processed in any combination, and delivered in a combination specific to at least one of said multiple target which consumes telemetry associated with the set of service flows received by said at least one of said multiple targets.

19. A method of providing a unified data-flow execution pipeline to multiple targets, by a configurable data collection, processing, and delivery system, said method comprising the steps of:

collecting, from multiple heterogeneous sources, at least two of said multiple sources being of different types, multiple data collection sets defined by the data available to the system, at least two of the multiple data collection sets being of different types;

organizing said multiple data collection sets into at least one unified N-dimensional tensor based telemetry data stream without loss of quality or generality, said telemetry data stream being associated with at least one service flow, each of said at least one service flow being a virtual data stream associated with a unique service identifier;

dynamically configuring at least one execution module, which forms part of said configurable data collection, processing, and delivery system and operates independently of other execution modules, in real time, based on said collected multiple data collection sets and on said at least one telemetry data stream and said at least one service flow organized therefrom;

processing said at least one telemetry data stream and said at least one service flow by said at least one execution module to execute a set of operations, transformations, and algorithms on said at least one telemetry data stream; and further processing said at least one processed telemetry data stream to form multiple target destination delivery streams, each of said multiple target destination delivery streams adhering to transport characteristics and to a transmission process required by at least one of said multiple targets and is ready for delivery to at least one of said multiple targets, wherein at least two of said multiple target destination streams are delivered to at least two of said multiple targets by at least one transport delivery system.

\* \* \* \* \*